(12) United States Patent  (10) Patent No.: US 8,924,847 B2
Peters et al.  (45) Date of Patent: Dec. 30, 2014

(54) MULTILAYER STYLE SHEET APPROACH AND SYSTEM

(75) Inventors: Jonathan E. Peters, Conyers, GA (US); Matthew R. Foster, Poplar Grove, IL (US)

(73) Assignee: Accenture Global Services Limited, Dublin (IE)

( * ) Notice: Subject to any disclaimer, the term of this patent is extended or adjusted under 35 U.S.C. 154(b) by 321 days.

(21) Appl. No.: 13/436,182

(22) Filed: Mar. 30, 2012

(65) Prior Publication Data

US 2012/0254731 A1   Oct. 4, 2012

Related U.S. Application Data

(60) Provisional application No. 61/470,288, filed on Mar. 31, 2011.

(51) Int. Cl.
G06F 17/00 (2006.01)
G06F 17/22 (2006.01)
G06F 17/21 (2006.01)

(52) U.S. Cl.
CPC .......... *G06F 17/218* (2013.01); *G06F 17/2247* (2013.01)
USPC ......................................................... 715/235

(58) Field of Classification Search
CPC ................ G06F 17/248; G06F 17/218; G06F 17/30905; G06F 17/211; G06F 17/2264; G06F 17/243
USPC .................................................. 715/235, 236
See application file for complete search history.

(56) References Cited

U.S. PATENT DOCUMENTS

| | | | | |
|---|---|---|---|---|
| 5,652,901 | A * | 7/1997 | Slayden et al. | 715/209 |
| 6,996,768 | B1 * | 2/2006 | Elo et al. | 715/206 |
| 7,055,094 | B2 * | 5/2006 | Imielinski et al. | 715/239 |
| 7,117,429 | B2 * | 10/2006 | Vedullapalli et al. | 715/235 |
| 7,310,646 | B2 * | 12/2007 | Rangadass et al. | 1/1 |
| 7,398,472 | B2 * | 7/2008 | Corrington et al. | 715/762 |
| 7,562,070 | B2 * | 7/2009 | Tchaitchian et al. | 1/1 |
| 7,594,166 | B1 * | 9/2009 | Ramakrishna et al. | 715/234 |
| 7,627,814 | B1 * | 12/2009 | Soldan et al. | 715/236 |
| 7,770,107 | B2 * | 8/2010 | Jiang et al. | 715/236 |
| 7,783,971 | B2 * | 8/2010 | Villaron et al. | 715/248 |
| 7,877,682 | B2 * | 1/2011 | Aegerter | 715/237 |
| 8,423,888 | B2 * | 4/2013 | Odagiri et al. | 715/239 |
| 2004/0187080 | A1 * | 9/2004 | Brooke et al. | 715/522 |
| 2004/0210556 | A1 * | 10/2004 | Brooke et al. | 707/1 |
| 2005/0102610 | A1 * | 5/2005 | Jie | 715/513 |
| 2005/0132284 | A1 * | 6/2005 | Lloyd et al. | 715/517 |
| 2005/0160359 | A1 * | 7/2005 | Falk et al. | 715/513 |
| 2005/0283719 | A1 * | 12/2005 | Awamoto et al. | 715/513 |
| 2009/0235186 | A1 * | 9/2009 | Howard et al. | 715/760 |
| 2010/0037177 | A1 * | 2/2010 | Golsorkhi | 715/818 |
| 2011/0066934 | A1 * | 3/2011 | Treisman et al. | 715/222 |
| 2013/0033523 | A1 * | 2/2013 | Stovicek et al. | 345/649 |
| 2013/0124962 | A1 * | 5/2013 | Mitchell | 715/229 |
| 2013/0232406 | A1 * | 9/2013 | Sampathkumar et al. | 715/236 |

OTHER PUBLICATIONS

Office Action issued in corresponding Australian Patent Application No. 2012201890, mailed Apr. 23, 2013, 4 pages.

* cited by examiner

*Primary Examiner* — Laurie Ries
(74) *Attorney, Agent, or Firm* — Brinks Gilson & Lione

(57) ABSTRACT

A multilayer style sheet method includes retrieving multiple style sheets, the style sheets comprising multiple layers in a hierarchy, the layers comprising characteristics of features for electronic documents, and generating an electronic document based on the style sheets.

22 Claims, 33 Drawing Sheets

Section 1

Name: New Plastics Offerinf Displ Testing

Description: Model Execution for testing of the New Plastics Offering. Includes Product Recall coverage.

Product Group: New Plastics Offering

Type: New Offering

Created by: Richard K. Fondsden

ID: MODELD0027

Created Date: 4/12/2009

ISC Style Guide, Version 1.1.0 (20100825)

Section Layout Styles

| Style Sheet | Description |
| --- | --- |
| layout_sections-100.css | Use this layout when you want columnB or columnD to be 100% of the width. |
| layout_sections-20-60-20.css | Use this layout when you want a 20/60/20 layout for columns A, B and C |
| layout_sections-20-80.css | Use this layout when you want a 20/80 layout of columns A & B |
| layout_sections-20a-45e-35b.css | Use this layout when you want a 20/45/30 layout of columns A, E & B |
| layout_sections-20a-60e-20b.css | Use this layout when you want a 20/60/20 layout of columns A, E & B |
| layout_sections-30-70.css | Use this layout when you want a 30/70 layout of columns A & B |
| layout_sections-33-33-33.css | Use this layout when you want a 33/33/33 layout for columns A, B and C |
| layout_sections-50-50.css | Use this layout when you want a 50/50 layout of columns A, B or C |
| layout_sections-60-40.css | Use this layout when you want a 60/40 layout of columns B & C |
| layout_sections-70-30.css | Use this layout when you want a 70/30 layout of columns B & C |

```
Specifications

Construction Details

Number of Stories      Fire Co
        2                      Joist

Roof Type
        Sloped          [v]

Alarm Details

Fore Alarm(s)          Smoke
        Local Alarm     [v]    Loca

Water Alarm(s)         Sprink
        Local Alarm     [v]    Loca
```

Page Title Goes Here

Section 1

Name: New Plastics Offering Displ Testing

ID: MODEL00027

Description: Model Execution for testing of the New Plastics Offering. Includes Product Recall coverage.

Product Group: New Plastics Offering

Type: New Offering

Crated By: Richard K. Fondsden

Created Date: 4/12/2009

Cancel  Save

Section 2

Section 3

Search Preview Table Example

Field Information

Data Type          Valid Value
Description        This field indicates that towing is covered under the policy.
Effective Date     09/01/2009
Expiration Date    01/01/2999
Where Used         Policy Information (Policy Details page)

Data Object Information

Name               General Policy
Description        This is an custom data object for a custom policy field.

```
Claim Tree Table Example

Policy        DMZ_CAU_0002              ⇨
Insured       Sweets Bakery             ⇨
Claim         DM4029000006              ⇨
DoL           02-03-2009
Owner         Jessica L.Yang            ⇨

Participant View                      ▽

Involved Vehicles

Other Damages

Sweets Bakery                          ⇨
    Camp/OTC         open               ⇨
 Janet Churasco                         ⇨
    VPD              closed             ⇨
    BI               reopen             ⇨
```

Dashboard Table Styles Example

System Downtime
System downtime this Saturday, March 17

New Regulatory Requirements
As of June 1, replace all existing EOB forms due to new regulatory requirements System Downtime
System downtime this Saturday, March 24

Dashboard Table Styles Example

System Downtime
System downtime this Saturday, March 17

New Regulatory Requirements
As of June 1, replace all existing EOB forms due to new regulatory requirements

Plain Table Styles Example

Policy Number      C91_172_A102

Policy Status      INFORCE

Effective Date     01/01/2007

Expiration Date    12/31/2009

ISC Style Guide, Version 1.1.0 (20100825)

Section Layout Styles

| Style Sheet | Description |
|---|---|
| layout_sections-100.css | Use this layout when you want columnB or columnD to be 100% of the width. |
| layout_sections-20-60-20.css | Use this layout when you want a 20/60/20 layout for columns A, B and C |
| layout_sections-20-80.css | Use this layout when you want a 20/80 layout of columns A & B |
| layout_sections-20a-45e-35b.css | Use this layout when you want a 20/45/30 layout of columns A, E & B |
| layout_sections-20a-60e-20b.css | Use this layout when you want a 20/60/20 layout of columns A, E & B |
| layout_sections-30-70.css | Use this layout when you want a 30/70 layout of columns A & B |
| layout_sections-33-33-33.css | Use this layout when you want a 33/33/33 layout for columns A, B and C |
| layout_sections-50-50.css | Use this layout when you want a 50/50 layout of columns A, B or C |
| layout_sections-60-40.css | Use this layout when you want a 60/40 layout of columns B & C |
| layout_sections-70-30.css | Use this layout when you want a 70/30 layout of columns B & C |

FIG. 31

ISC Style Guide, Version 1.1.0 (20100825)

Form Layout Styles

| Style Sheet | Description | Example |
|---|---|---|
| layout_forms-20-20-20-20-20.css | Use this layout when you want a 5 column form layout. | |
| layout_forms-25-25-25-25.css | Use this layout when you want a 4 column form layout. | |
| layout_forms-30-70.css | Use this layout when you want a 2 column form layout. With this layout, it is expected that the field lable {<p>} is in a .small left column and the field control is in a .medium right column. | `<div class="formLayout">`<br>`<div class="fullrow">`<br>`<div class="small=><p>Was a machine or tool involved in this accident?</p></div>`<br>`<div class="medium">`<br>`<select>`<br>`<option delected>Yes</option>`<br>`<option>No</option>`<br>`</select>`<br>`</div>`<br>`</div>`<br>`</div>` |
| layout_forms-33-33-33.css | Use this layout when you want a 3 column form layout. | |
| layout_forms-50-50.css | Use this layout when you want a 2 column form layout. | |
| layout_forms-50r-50.css | Use this layout when you want a 2 column form layout. With this layout, it is expected that the field lable {<p>} is in a .small left column and the field control is in a .medium right column. | See layout_forms-30-70.css for a coding example |

MULTILAYER STYLE SHEET APPROACH AND SYSTEM

RELATED APPLICATIONS

This application claims priority to U.S. Provisional Patent Application Ser. No. 61/470,288, filed Mar. 31, 2011, which is also incorporated herein by reference in its entirety.

BACKGROUND

1. Technical Field

This application relates to hypertext-markup language documents and style sheets. In particular, this application relates to a multi-layered approach for style sheets.

2. Related Art

The Internet and web pages have been used by businesses for many years to promote services and products. Recently, web-based applications have been developed which allow businesses to directly provide services on the internet. As more business use the Internet and web pages to promote and provide services, the need arises to provide a better experience to the user by enhancing the look and feel of the web pages and web-based services. While the aesthetic features may be directly incorporated into the body of the HTML code of the web pages or web-based applications, styles sheets have been developed to allow better management of the aesthetic elements and layout of the web pages or web-based applications. However, in the past, each style sheet was unique to a specific web page and efficient management of the look and feel across different applications was therefore difficult.

Therefore, a need exists to address the problems noted above and others previously experienced.

SUMMARY

A multilayer style sheet method includes retrieving a plurality of style sheets. The plurality of style sheets comprises a plurality of layers in a hierarchy. The layers comprise characteristics of features for electronic documents. The method generates an electronic document based on the hierarchy of style sheets.

Other systems, methods, features and advantages will be, or will become, apparent to one with skill in the art upon examination of the following figures and detailed description. It is intended that all such additional systems, methods, features and advantages be included within this description, be within the scope of the invention, and be protected by the following claims.

BRIEF DESCRIPTION OF THE DRAWINGS

The system may be better understood with reference to the following drawings and description. The components in the figures are not necessarily to scale, emphasis instead being placed upon illustrating the principles of the invention. Moreover, in the figures, like referenced numerals designate corresponding parts throughout the different views.

FIG. 13 shows a screenshot of a form of a web page.

FIG. 15 shows a list of different style sheets defining layouts of columns in a main content area section of a web page.

FIG. 19 shows a diagram of a title column.

FIG. 20 shows a diagram of a lateral list metaphor.

FIG. 22 shows a diagram of a form.

FIG. 26 shows a diagram of a table for search preview.

FIG. 27 shows a diagram of an action table.

FIG. 28 shows a diagram of a dashboard table.

FIG. 29 shows a diagram of a plain table.

FIG. 31 shows a list of section layout style sheets.

FIG. 32 shows a list of form layout style sheets.

DETAILED DESCRIPTION OF THE PREFERRED EMBODIMENTS

The multilayer style sheet method ("multilayer method") may use structured hypertext markup language ("HTML") and style sheets to provide a flexible styling of web pages and web applications. The method may use structured HTML and multiple layers of style sheets.

Figure 1:
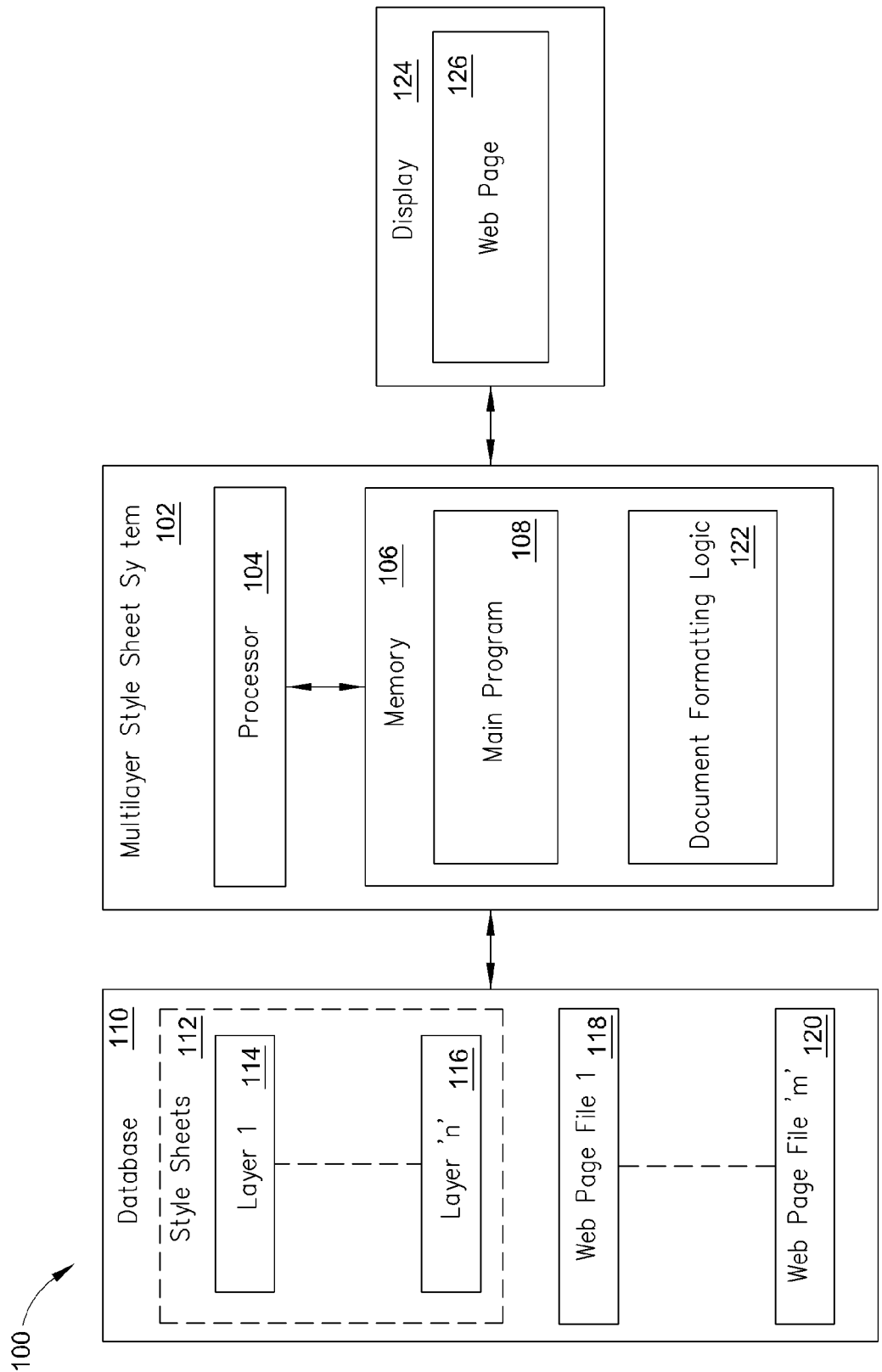
FIG. 1 shows a diagram of the multilayer style sheet system.

FIG. 1 shows a diagram 100 of a multilayer style sheet system ("system") 102 which may implement the multilayer method. The system 102 may include a processor 104 and a memory 104 coupled to the processor. The memory 104 may include a main program 106 containing logic for operating the system 102. The system 102 may be coupled to a database 110. The database 110 may include a plurality of style sheets 112. The style sheets 112 may include a plurality of layers of style sheets, for example, layer 1 114 to layer 'n' 116. The layer 1 114 to layer 'n' 116 may be arranged in a hierarchy. Each layer 1 114 to layer 'n' 116 may be a separate style sheet. The database 110 may also include a plurality of web page files, for example, web page file 1 118 to web page file 'm' 120.

The memory 104 may also include document formatting logic 122. The document formatting logic 122 may read the style sheets 112, apply the style sheets to an electronic document data, and generate an electronic document. The electronic document data may be, for example, a web page file containing code for a web page. The electronic document may be, for example, a web page of a web site or an application. The document formatting logic 122 may be incorporated into the main program 106, or may be stored separately in the memory 104. In addition, the system 102 may be coupled to a display 124, which may display a web page 126.

While FIG. 1 shows the layers and the web pages all in a single database 110, the layers and the web page files may be stored across multiple databases, systems or other storage. Also, the layers and the web page files may be stored locally, or may be accessed remotely. Further, the database 110 and its contents may be implemented as a separate system, or may be incorporated in the system 102.

Figure 2:
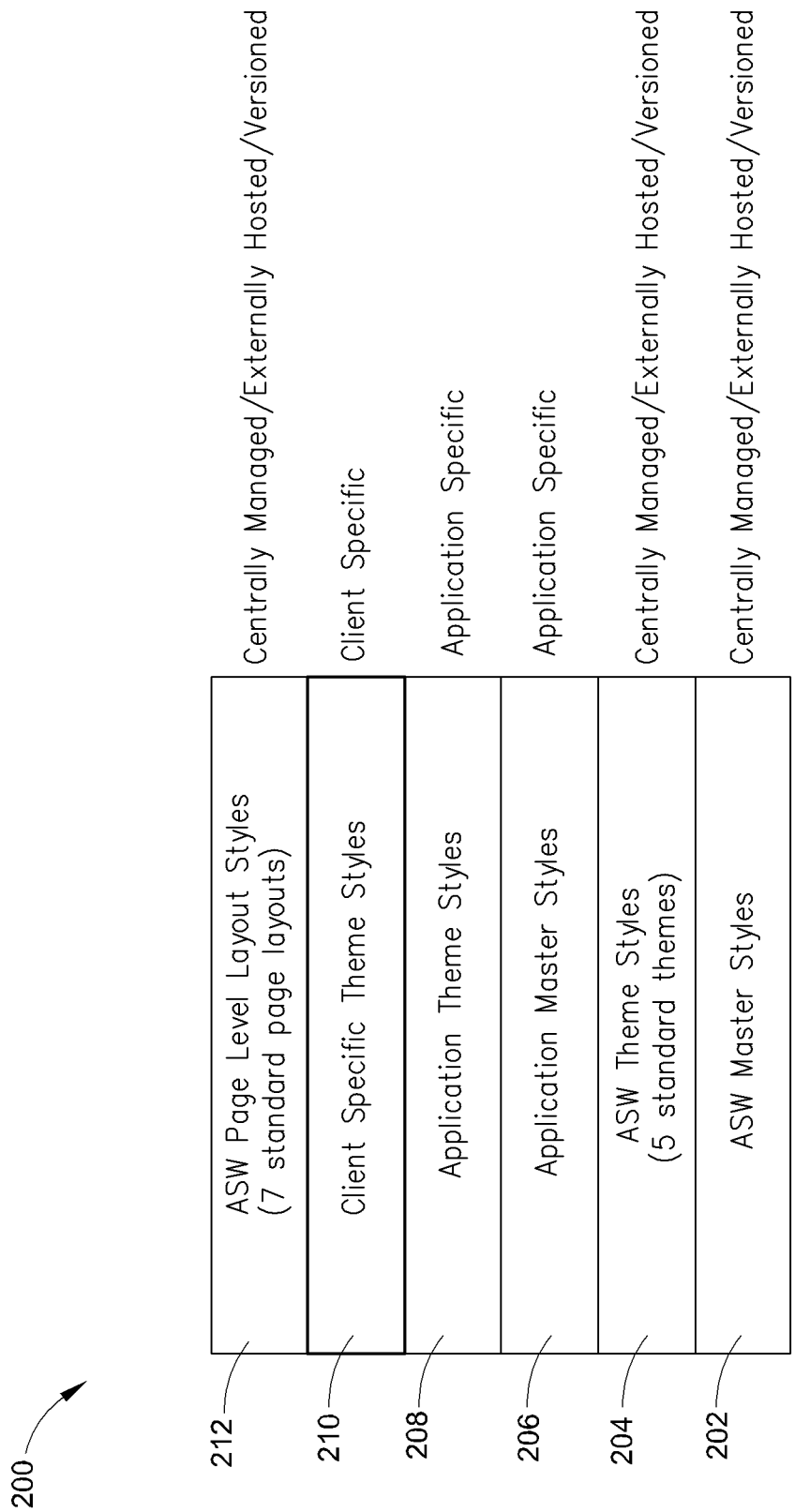
FIG. 2 shows a diagram of different layers of style sheet of the multilayer style sheet approach method.

FIG. 2 shows a diagram 200 of the preferred six layers of style sheets which the multilayer method may use. In one embodiment, the six layers of style sheets that are used include the master 202, theme 204, application master 206, application theme 208, client theme 210 and page level layout 212. These six layers may be arranged in a hierarchy—master 202 being the highest in the hierarchy, next in the hierarchy may be theme 204, next may be application master 206, next may be application theme 208, second to lowest in the hierarchy may be client theme 210, and the lowest in the hierarchy may be page level layout 212. Other predetermined hierarchies and other predetermined different number of layers may also be used.

Features described in a higher layer may be inherited to all the layers below. Further, if a lower layer describes a feature of a higher layer differently, then the lower layer may override the description of the higher layer for the given feature. Therefore, the layers of style sheets arranged in an hierarchy allows multiple applications or web pages to maintain a consistent look and feel, while providing for efficient customization of web pages to meet the needs of specific applications, customers, or pages.

Some or all the layers of style sheets may be centrally managed. For example, the master 202 and the master theme 204 layer style sheets may be created, stored, and updated by a single entity at a single location. New styles or updates to the style sheets may be provided periodically. The master 202 and theme 204 layer style sheets may contain the core styles that may provide the basic look and feel of web sites or applications. Individual web sites or applications may manage a set of layers of style sheets, for example, the application master 206 and application theme 208 layer style sheets, to allow customization of the look and feel of the application. Such customization may include, for example, customizing the application's header and other application specific needs. Customers may be able to create their own themes to tailor the look of the applications to meet their own interface standards. Such customization may be performed by using the layers such as the client theme 210 and page level layout 212 layer style sheets.

The style sheets 112 used by the multilayer method may be implemented to be compatible with a predefined HTML coding pattern and to conform to the level of hierarchy described above, such that a custom style sheet which may be created and used by a client or for an application may be used across any application using the multilayer method.

Figure 3:
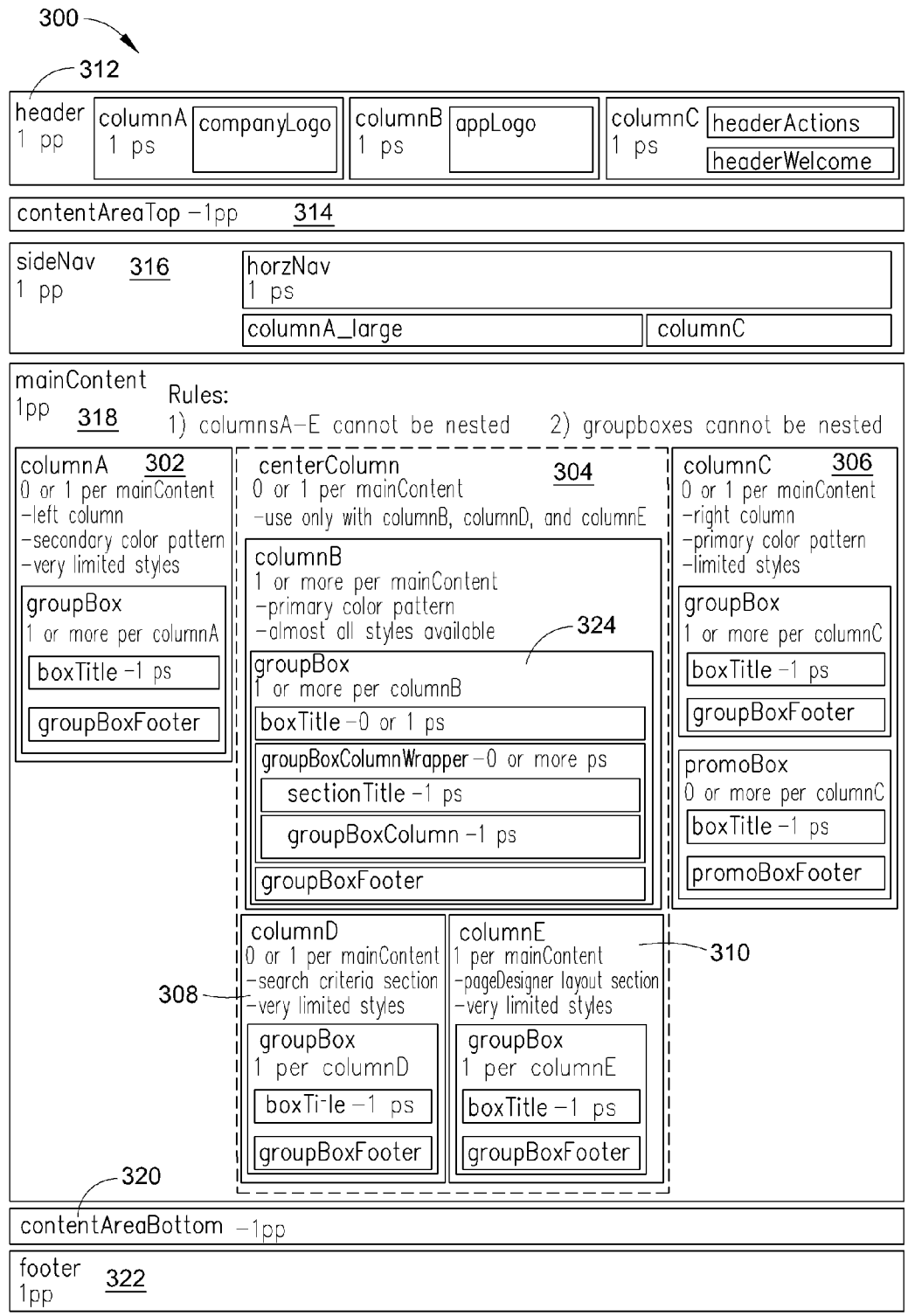
FIG. 3 shows a page layout used by the multilayer style sheet approach method.

FIG. 3 shows a page layout 300 which may be used by the multilayer method. As discussed above, applications using the multilayer method may be developed conforming to a predefined HTML coding pattern. The HTML coding pattern may direct the arrangement pattern of different elements included in a web page. These elements may include, for example, columns, forms, and fields. The style sheets 112 used by the multilayer method may be developed with the consideration that the web pages to which the style sheets may be applied will follow the predefined HTML coding pattern.

The page layout 300 may represent a layout of a web page which follows the HTML coding pattern. The HTML coding pattern may also define a page layout to be different from the page layout 300 shown in FIG. 3. A page layout may be implemented by the HTML code of a web page. The page layout may also be implemented by style sheets such as the page level layout 212 layer style sheet, or a combination of HTML code and style sheets. Page layout 300 includes three columns: columnA 302, centerColumn 304 and column C 306. The centerColumn 304 may include sub-columns columnD 308 and columnE 310. Other page layouts may be used, such as a one-column layout, a three-column layout having column width distribution of about 20%, 60% and 20%, respectively (the left-most column occupying about 20% of the width of the entire page, the center occupying about 50%, and the right column about 20% of the page width), a three-column layout with about 20%, 45% and 35% width distribution, and a three-column layout with three substantially evenly spaced columns. Two-column page layouts may also be provided, such as one with about 20%-left and 80%-right width distribution, one with about 30%-left and 70%-right width distribution, and one with about 70%-left and 30%-right width distribution. Other page layouts may also be provided.

As discussed above, through the use of multiple layers of style sheets arranged in a hierarchy, applications or web pages may be customized for specific needs at the application, client, and at the customer level, while maintaining a consistent look and feel across multiple applications.

Figure 4:
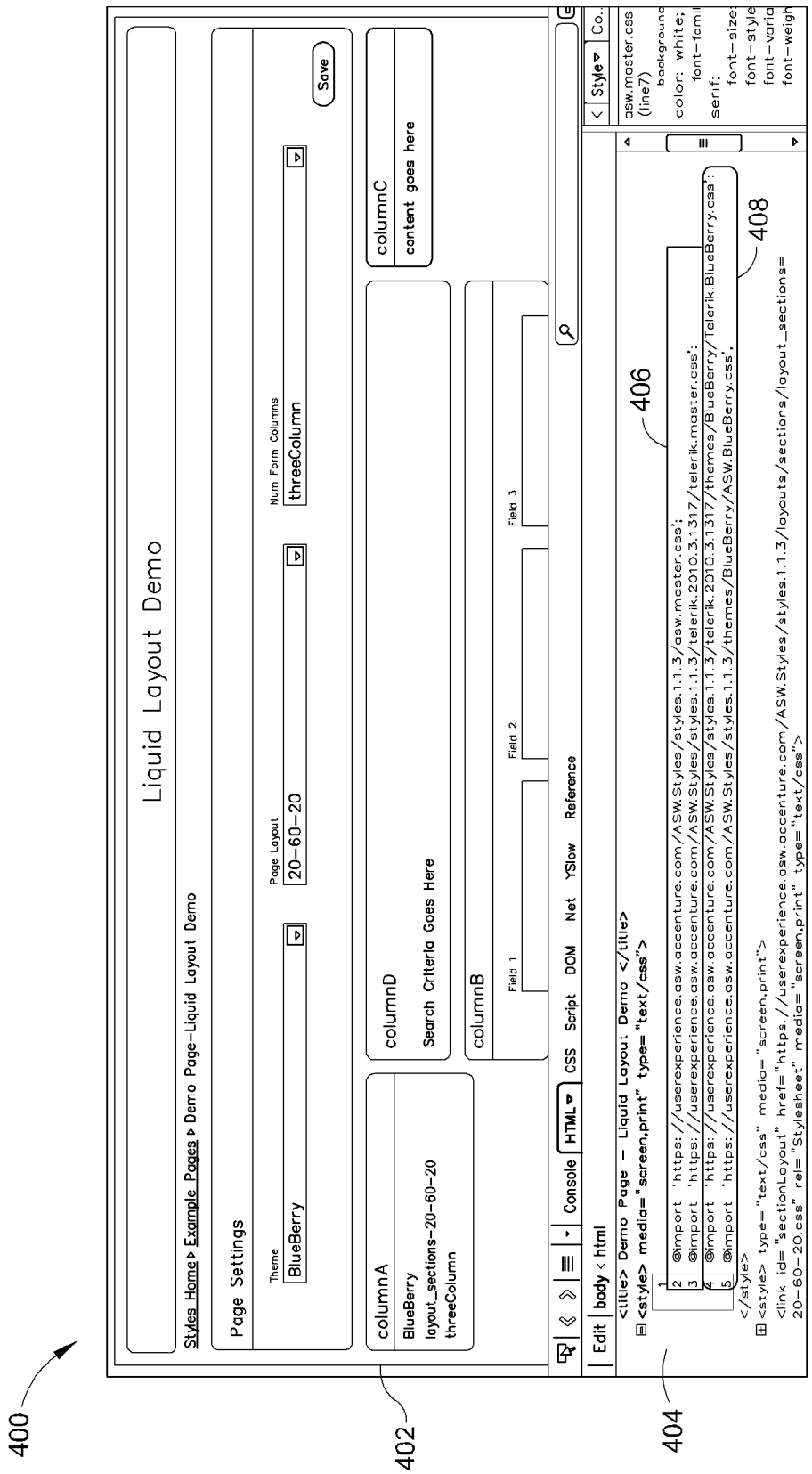
FIG. 4 shows a screenshot of a web page customized with a theme layer style sheet.
Figure 5:
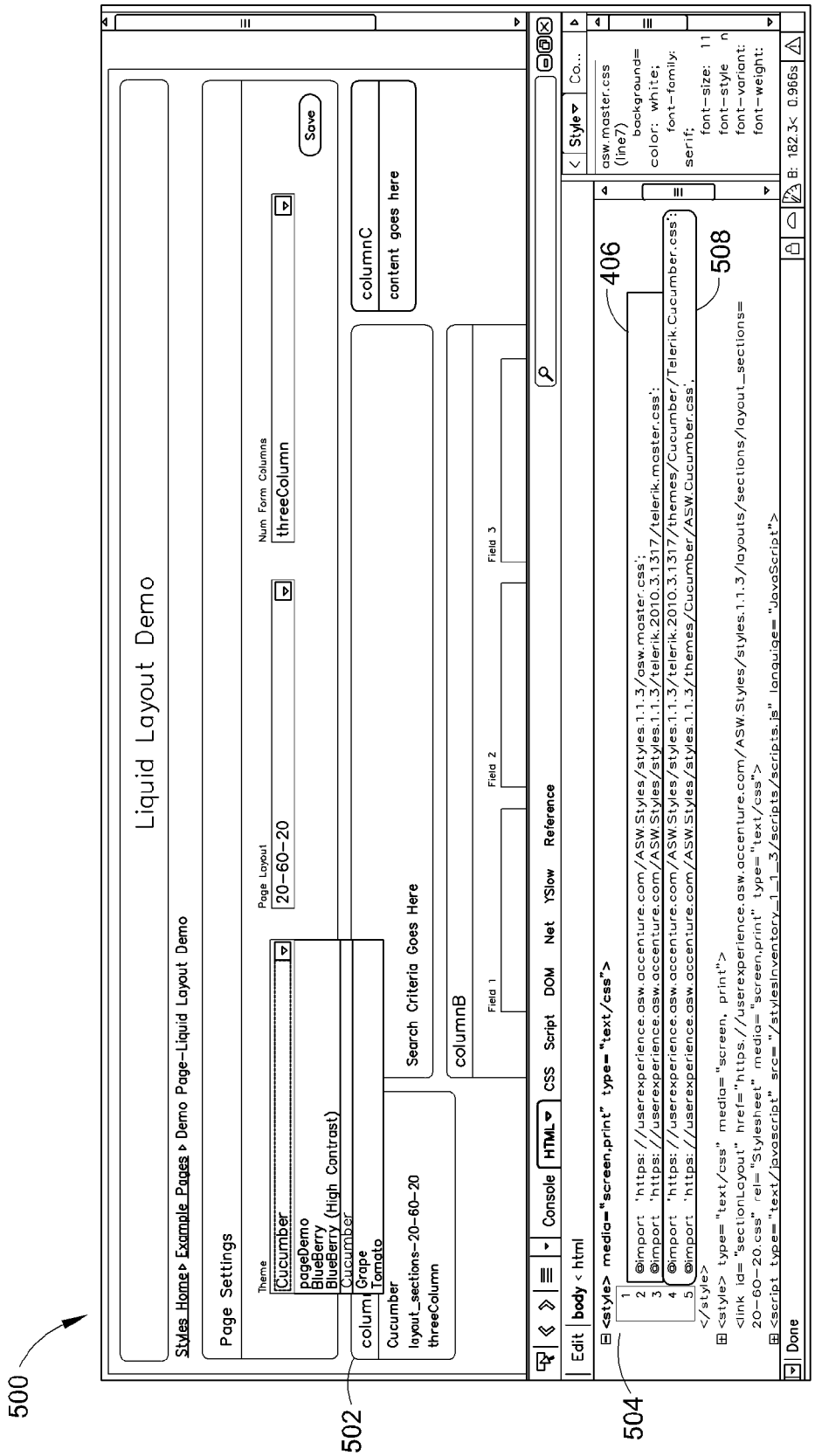
FIG. 5 shows another screenshot of a web page customized with a theme layer style sheet.

FIGS. 4 and 5 show screen shots 400-500 describing customizing the look and feel of an application using different application theme 206 layer style sheets.

An application may be provided with different application theme 206 layer style sheets representing different themes for the application. The themes may be, for example, BlueBerry, BlueBerry (high contrast), Cucumber, Grape, and Tomato. Screenshot 400 shows an example of a web page 402 generated using the BlueBerry application theme 206 layer, and its underlying HTML code 404. The underlying HTML code 404 includes code 406 for retrieving style sheets for a master 202 layer and an application master 206 layer, and code 408 for retrieving style sheets for application theme 208 and master theme 206 layers for the BlueBerry theme.

Screenshot 500 in FIG. 5 shows a web page 502 generated using the Cucumber application theme 206 layer, and its underlying HTML code 504. The underlying HTML code 504 includes the same code 406 for style sheets for the master 202 and application master 206 layers, different code 508 using the Cucumber theme style sheets for the application theme 208 and master theme 204 layers. Since different theme style sheets are used while using the same master and application layer, as compared to web page 402, the web page 502 shows the same overall look and feel while showing a different color scheme for the elements of the web page.

Figure 6:
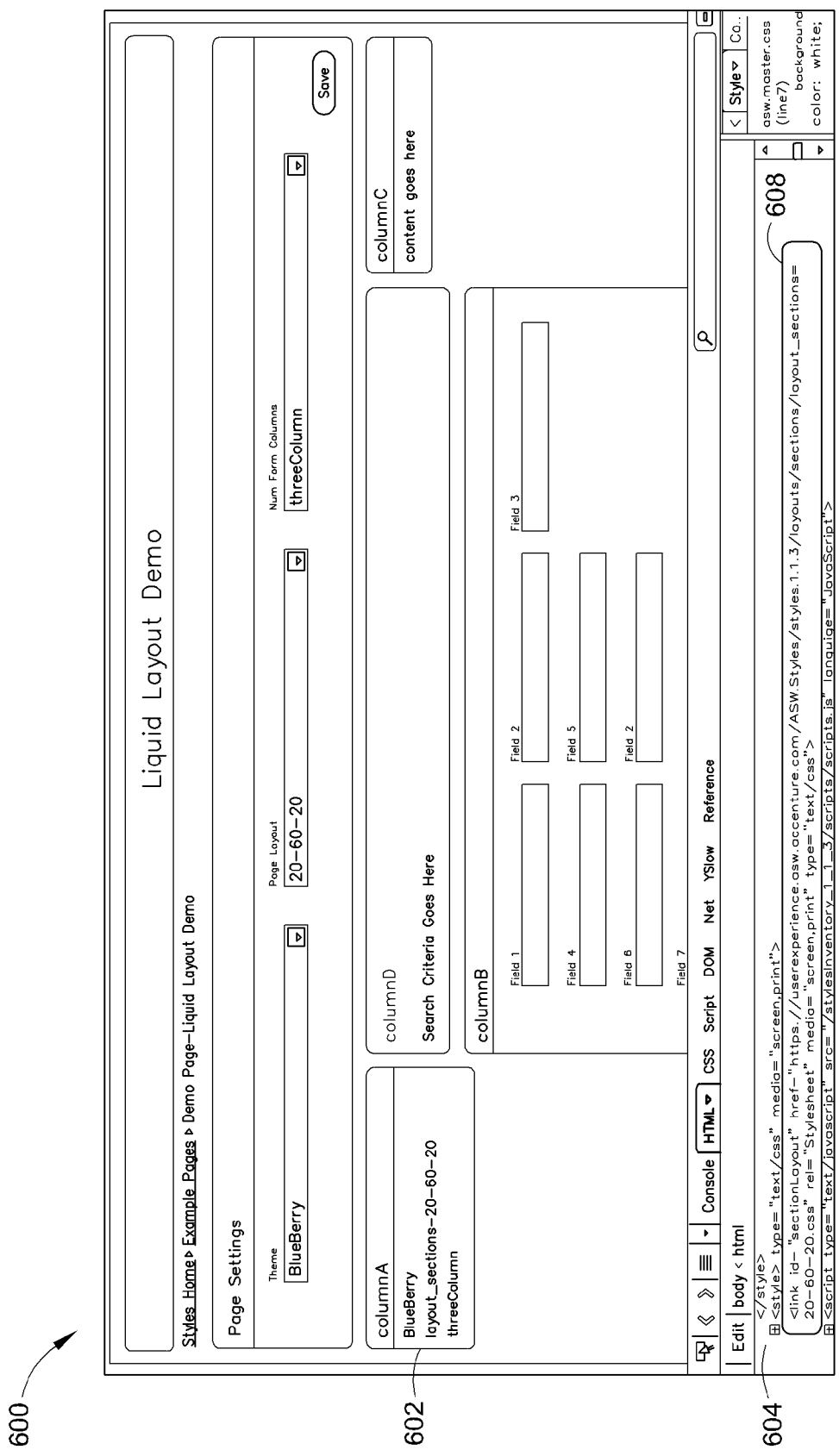
FIG. 6 shows a screenshot of a web page customized using a page level layout layer style sheet.
Figure 7:
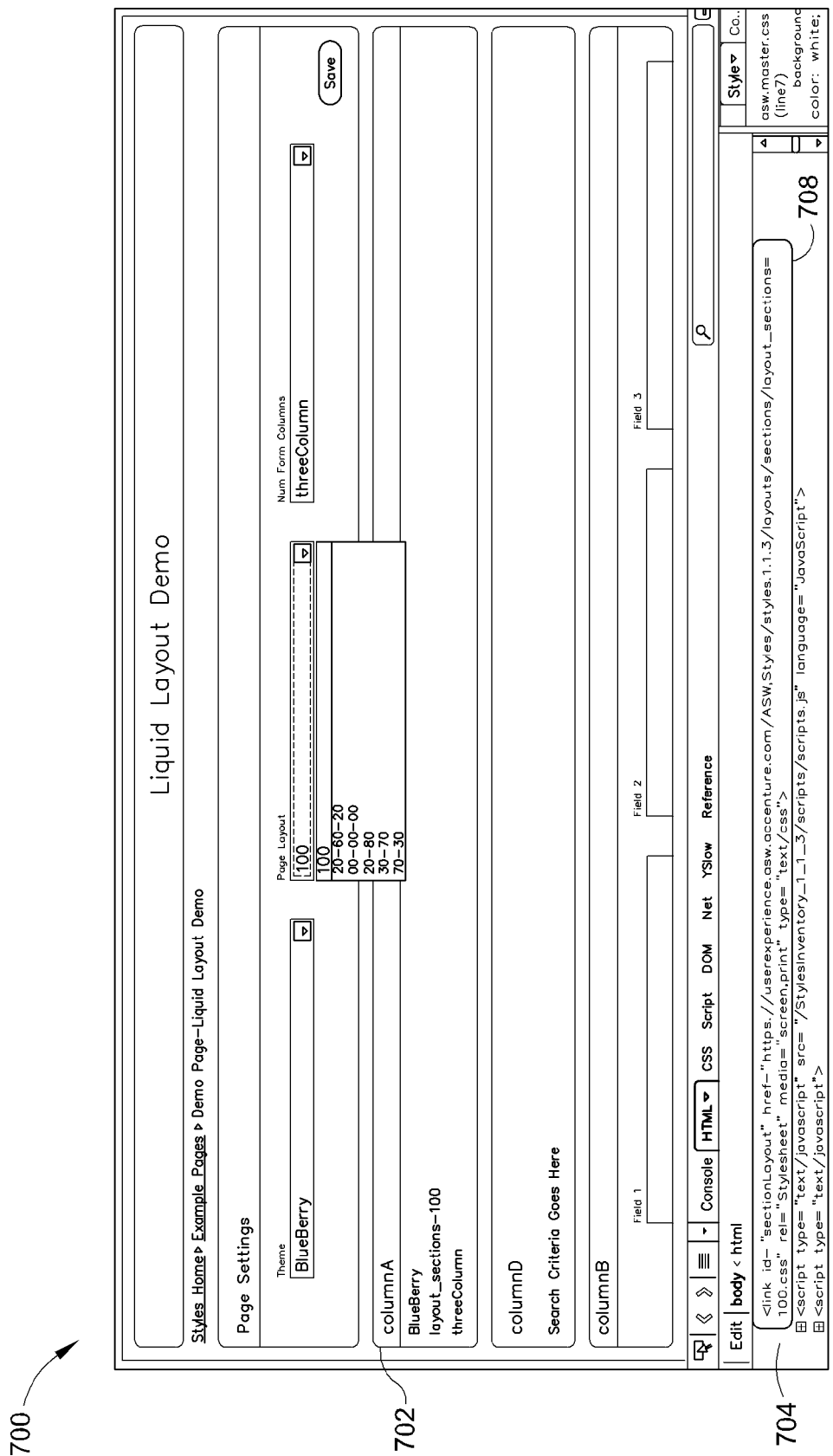
FIG. 7 shows another screenshot of a web page customized using a page level layout layer style sheet.
Figure 8:
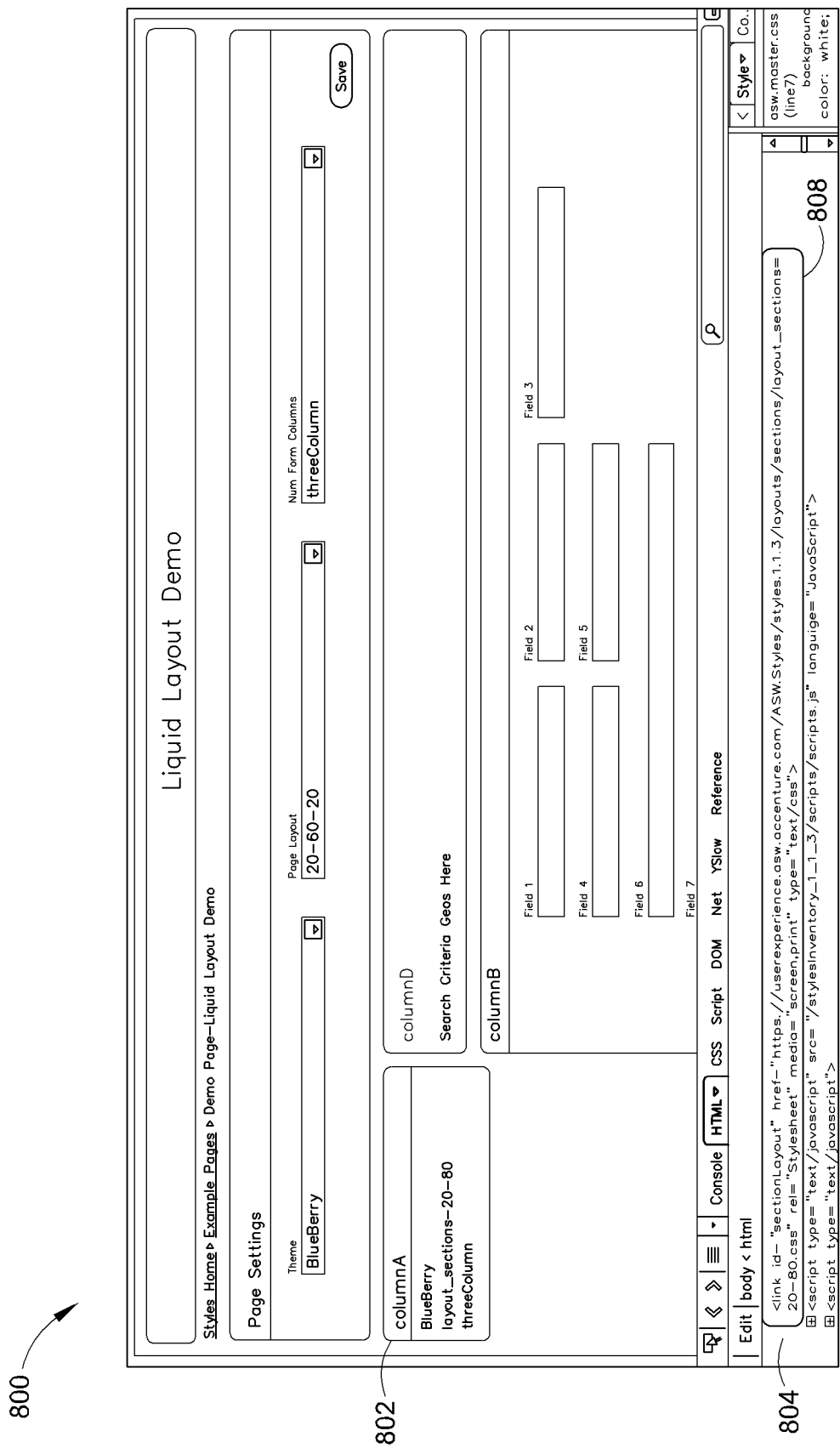
FIG. 8 shows another screenshot of a web page customized using a page level layout layer style sheet.

FIGS. 6-8 show screenshots 600-800 of web pages using different style sheets for the page level layout 212 layers, assuming identical style sheets are used for the remaining layers, including the theme layers 204 and 208. Screenshots 600-800 all show web pages using style sheets for a BlueBerry theme. The entire page layout may be determined by the page level layout 212 layer style sheets, and the underlying HTML code 604, 704, and 804 for the web pages shown in screenshots 600-800 may remain unchanged, except for the code sections 606, 706, and 806 which retrieve the different style sheets for the page level layout 212 layer.

Screenshot 600 shows a web page 602 and its underlying HTML code 604 using page level layout 212 layer style sheet for a 20-60-20 layout.

Screenshot 700 shows a web page 702 and its underlying HTML code 704 using page level layout 212 layer style sheet for a one-column layout. As compared to the HTML code 604 for the web page 602, the code section 606 may be modified to obtain the code section 706. The remaining sections of the HTML code 604 and 704 may be substantially identical. The result of the modification from section 604 to 704 may result in web page 702, which shows a single column page layout as opposed to web page 602 which shows a three-column 20-60-20 layout.

Similar changes to the code section 606 or 706 may be made to obtain the webpage 802 and its underlying code 804, which may show a two-column 20-80 page layout.

Figure 9:
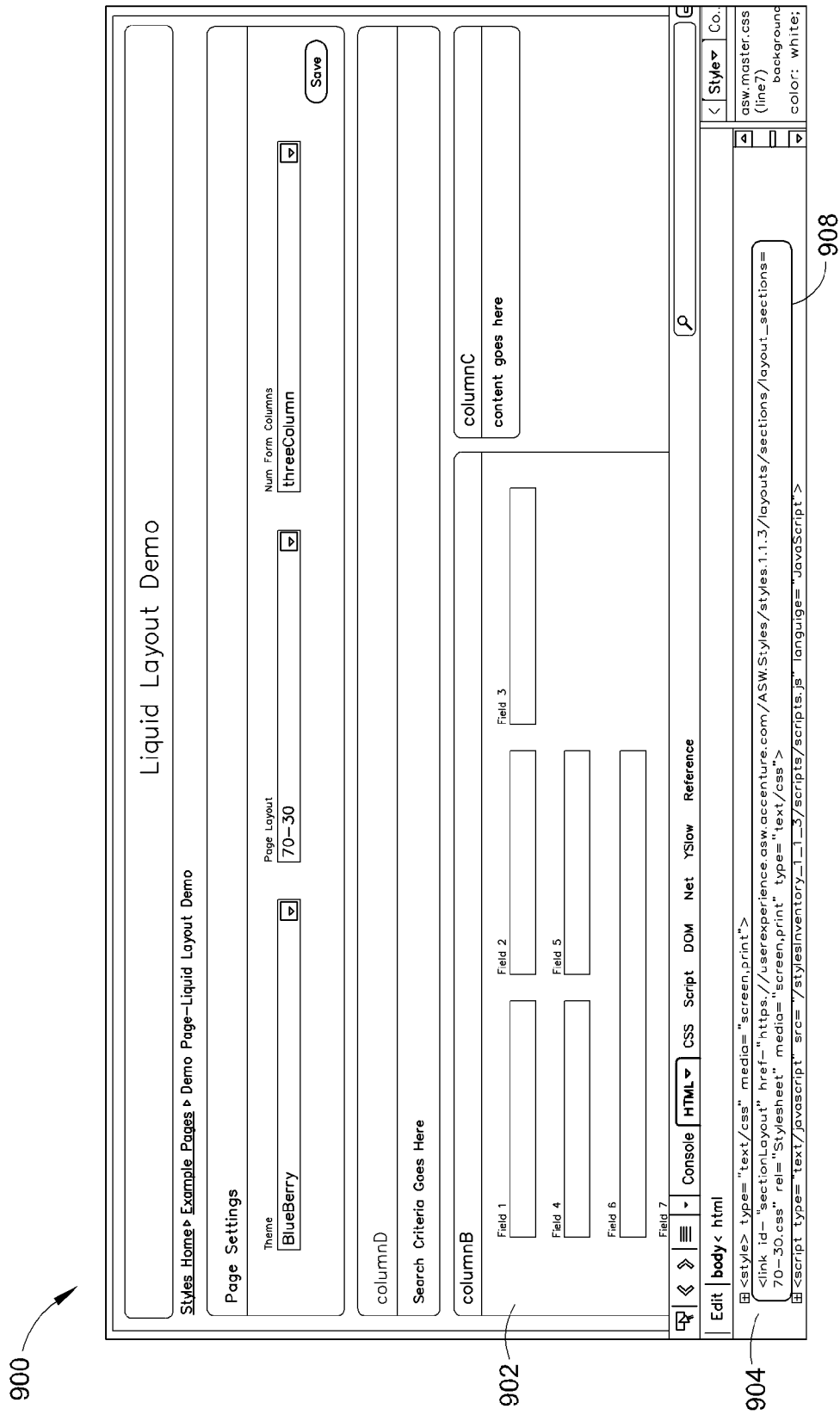
FIG. 9 shows another screenshot of a web page customized using a page level layout layer style sheet.

FIG. 9 shows yet another screen shot 900 showing a web page 902 using the BlueBerry style sheet for the theme layers 204 and 208, and using style sheet for a two-column 70-30 page layout for the page level layout 212 layer. The underlying HTML code 904 may be substantially identical with HTML codes 604, 704 and 804, while code section 908 may be different from sections 608, 708 and 808 to show the two-column 70-30 layout.

The HTML coding pattern used by the multilayer method may be defined to use <div> tags for the arrangement of forms and fields of a web page. The style sheets 112 for the page level layout 212 layer may include style definitions which may be used with the <div> tags to define the arrangement of the form and fields of the web page.

Figure 10:
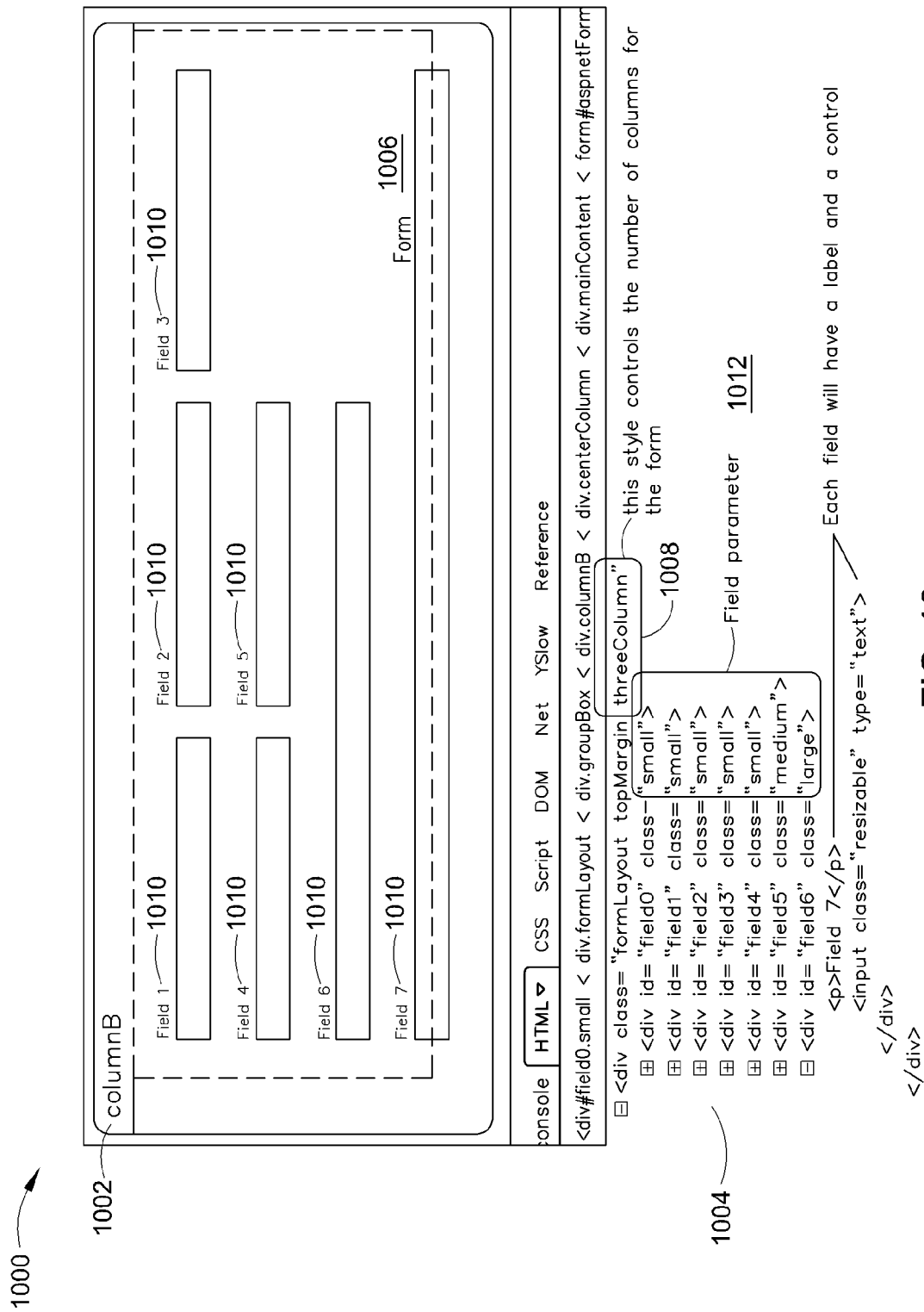
FIG. 10 shows a screen shot of a column of a web page and an HTML code section of the web page.

FIG. 10 shows a screenshot 1000 of a column 1002 of a web page, and an HTML code section 1004 defining the arrangement of form 1006 within column 1002. The arrangement of forms 1006 within the column 1002 may be defined using a <div> tag. Style classes may be defined in the style sheets 112 of the page level layout 212 layer. The style classes may be called inside the <div> tag to indicate a width of each form. For example, form 1006 may be three columns wide, and the number of columns within the form 1006 may be identified by calling "threeColumn" style class 1008. The form 1006 may be defined to include one or more fields 1010. The style sheets 112 may further define classes defining different configurations for the fields 1010, for example, small, medium and large. Small may indicate that a field is one column wide, medium may indicate two columns wide, and large may indicate three columns wide. The desired configuration of the fields 1010 may be identified by calling the desired classes (small, medium or large) in the field parameter entries 1012.

Figure 11:
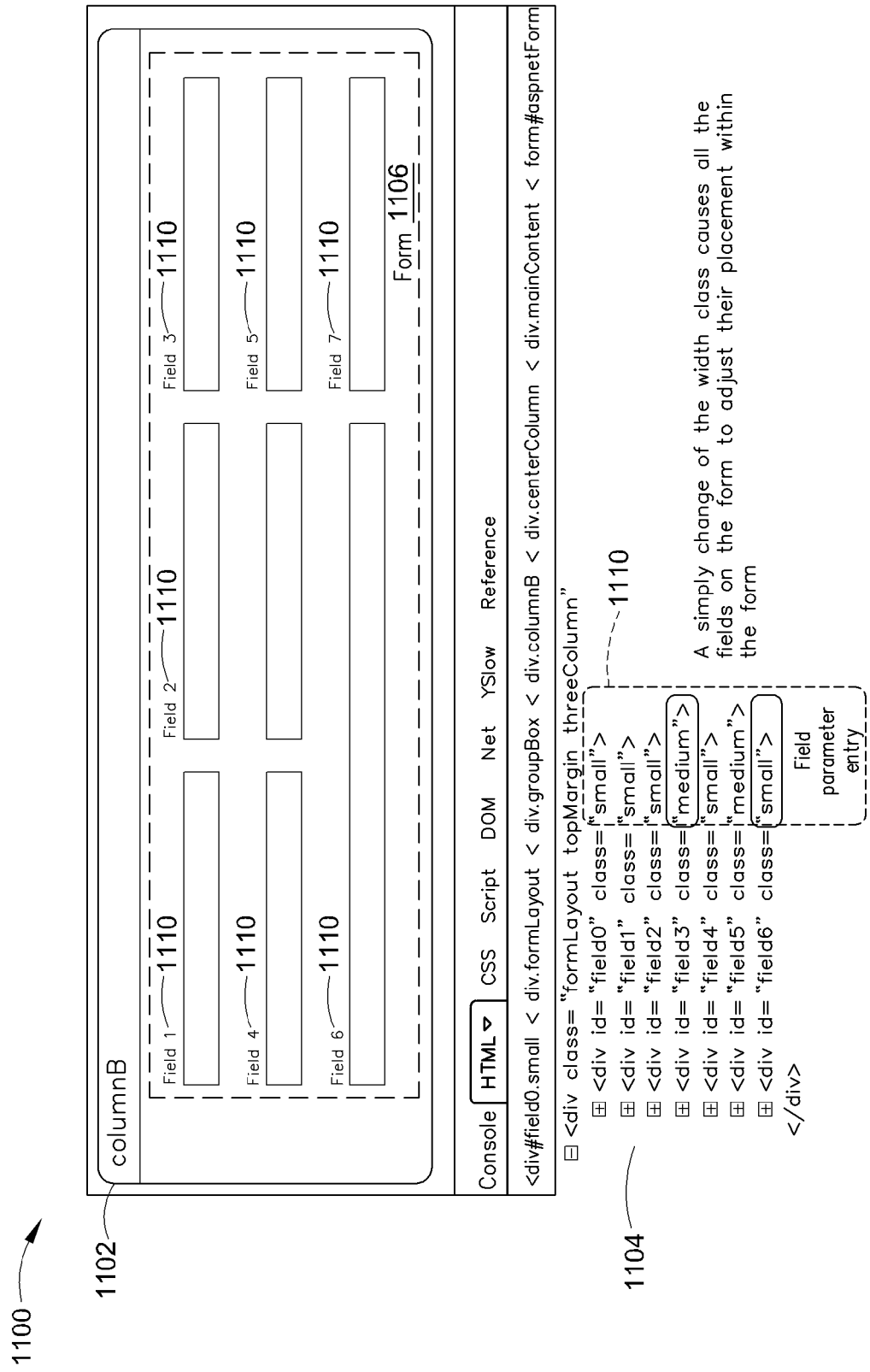
FIG. 11 shows a screenshot of another column of a web page.

FIG. 11 shows a screenshot 1100 of a column 1102 of a web page with a form 1106 having the same number of columns as the form 1006, but with different arrangement of fields 1110. As shown in the HTML code section 1104, the field parameter entries 1112 may be changed for each field 1110 to call a different class for the field configurations. For example, a change in the field parameter entry 1112 for fields 3 and 7 from "small" to "medium" may result in the fields 4 and 7 of the fields 1110 becoming two columns wide, as opposed as opposed to the fields of 1010, which are each one column wide.

Figure 12:
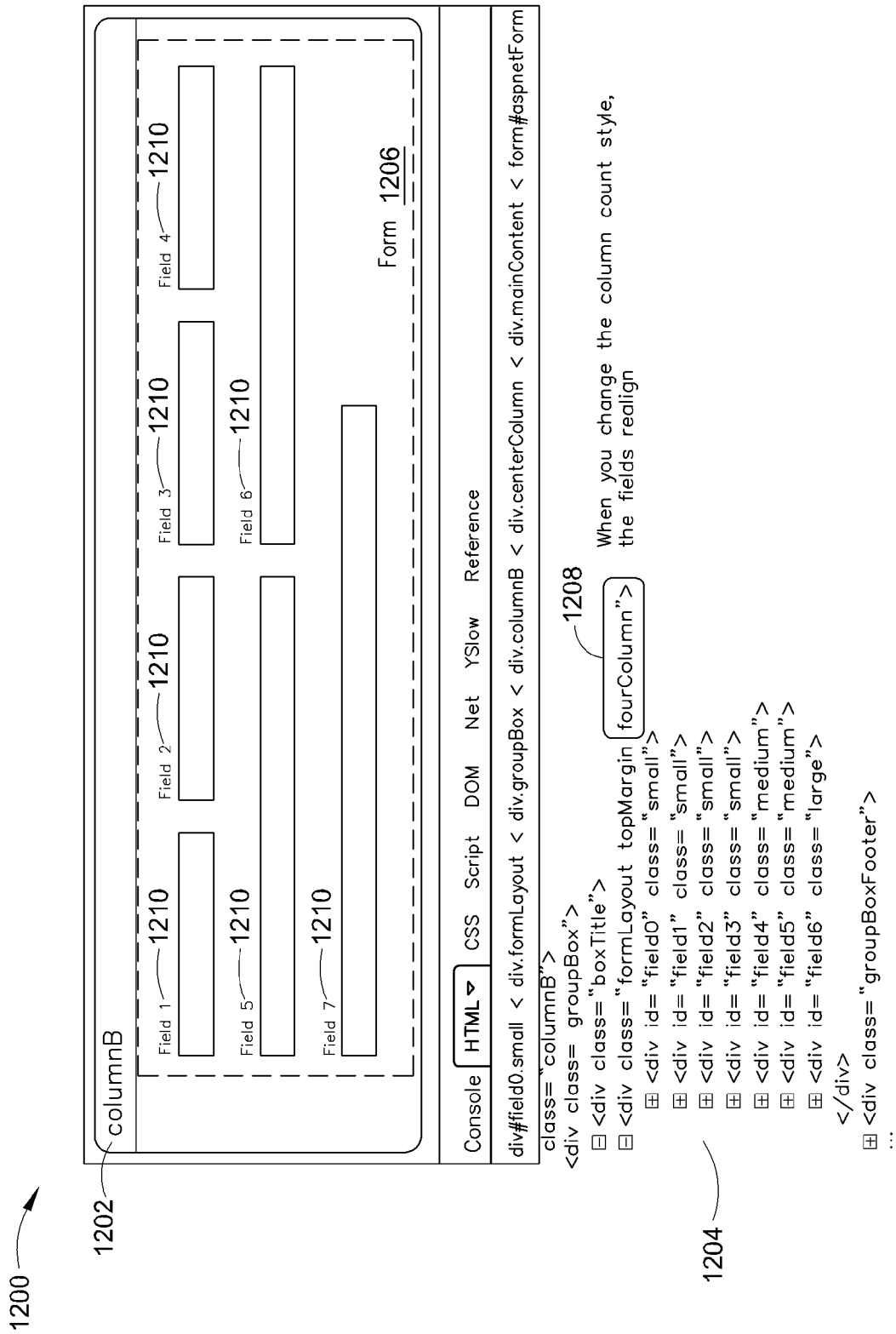
FIG. 12 shows a screenshot of another column of a web page.

FIG. 12 shows a screenshot 1200 of a column 1202 of a web page with a form 1206 in a four-column arrangement. The style sheets 112 may include a style class "fourColumn" defining a four-column arrangement of the form 1206, and the parameter entry 1208 may be defined to call the "fourColumn" class. The resulting fields 1210 of the form 1206 thus may be arranged in four columns, as compared to the three column arrangement of forms 1006 and 1106.

As discussed above, the HTML coding pattern may be defined to use the <div> tags for arranging various elements of a web page. The use of <div> tags allows a developer to build rules about when a field is visible on a per client basis. The use of <div> tags further allow developers to efficiently change the page layout through different style sheets 112 such as a page level layout 212 layer style sheets. For example, the number of form columns or the width of the columns may be efficiently changed when a web page is localized for different languages, which may require wider or narrower, or more or fewer, columns.

FIG. 13 shows a screenshot 1300 of a form 1302 of a web page. Table 1 shows the underlying HTML code of the form 1302.

TABLE 1

```
<div class="formLayout threeColumn">
    <div class="medium">
        <p>Name</p>
        <input type="text" class="resizable" value="New Plastics Offering Displ Testing"/>
    </div>
    <div class="small">
        <p>ID</p>
        <div class="control"><p>MODEL00027</p></div>
    </div>
    <div class="large">
        <p>Description</p>
        <textarea>Model Execution for testing of the New Plastics Offering. Includes Product Recall coverage.</textarea>
    </div>
    <div class="small">
        <p>Product Group</p>
        <input type="text" class="resizable" value="New Plastics Offering"/>
    </div>
    <div class="small">
        <p>Type</p>
        <input type="text" class="resizable" value="New Offering"/>
    </div>
    <div class="small">
        <p>Created Date</p>
        <telerik:RadDatePicker Runat="server" style="width: 100px;" SelectedDate="4/12/2009"></telerik:RadDatePicker>
    </div>
    <div class="small">
        <p>Created By</p>
        <input type="text" class="resizable" value="John Doe"/>
    </div>
</div>
```

Form 1302 shows a three-column layout. Table 1 shows that this three-column layout is achieved by calling the "threeColumn" style class which may be defined in style sheets 112. Other style classes defining a different layout may be defined in the style sheet 112. To use a different layout for the form 1302, the code of table 1 may be changed to call the name of a different style class instead of "threeColumn". In an embodiment, style sheets 112 may define style classes for two- to five-column layouts. In an embodiment, the style classes may define the exact arrangement and width of fields in the forms. In another embodiment, the style classes may leave the exact arrangement and widths of the fields open, to be defined by the HTML code of the web page.

In the multilayer method, the final assembly of a web page may be dynamically made. The fields may "float" into position. Based on the number of columns in the form and on the width of the fields, the page may automatically assemble itself. The document formatting logic 122 of the system 102 may contain logic for executing such assembly. The automatic assembly of the form may allow the system 102 to take into account visibility rules on the fields more efficiently. If a field is not visible, the styles defined in style sheets 112 may allow the system 102 to assemble pages without gaps, and without a need for a programmer to clean up the page layout.

Figure 14:
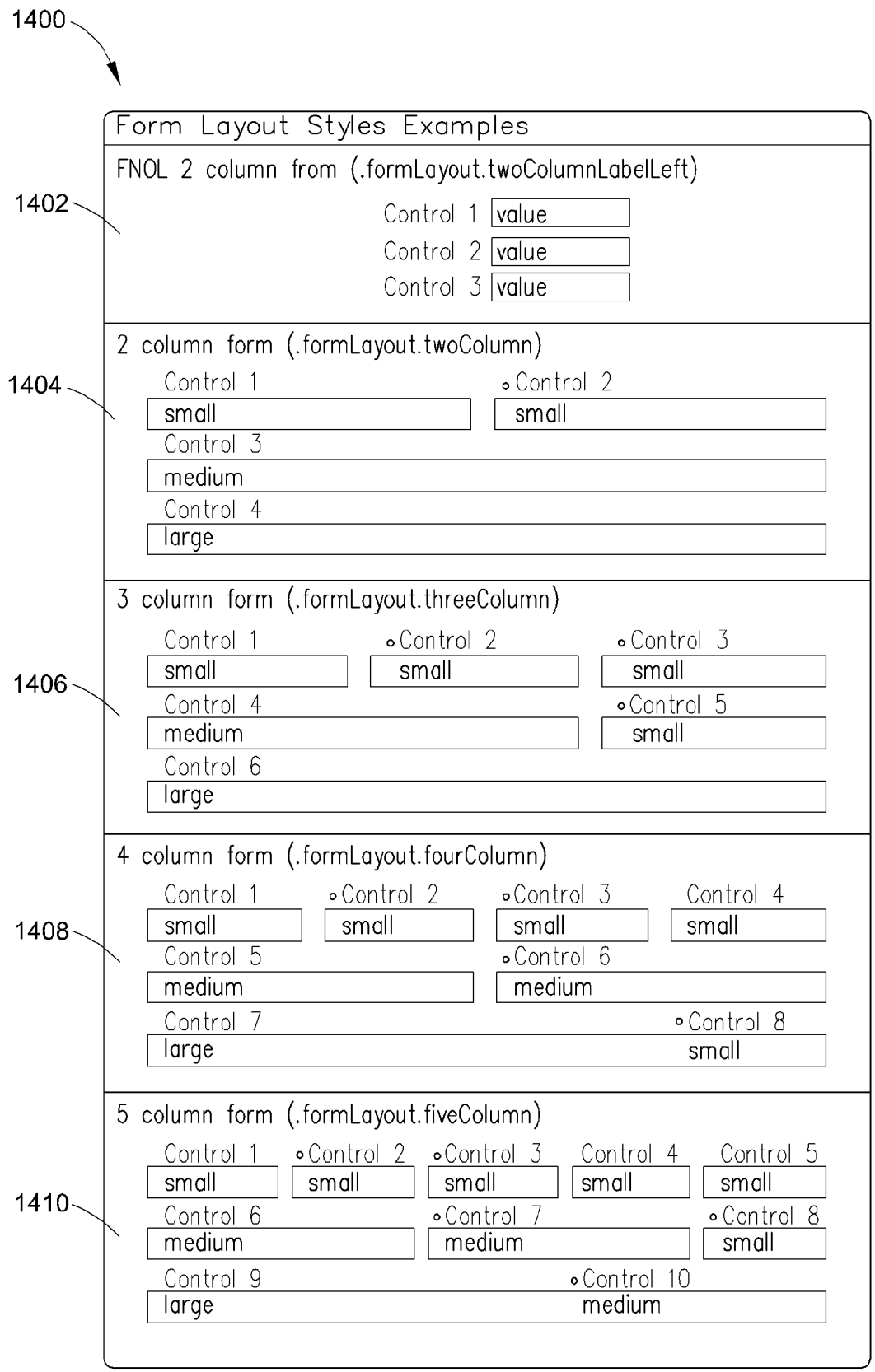
FIG. 14 shows a diagram of styles for form layouts.

FIG. 14 shows diagram 1400 of exemplary styles for form layouts which may be defined in style sheets 112. The styles may include a two-column with spaces for labels 1402, regular two-column form 1404, three-column form 1406, four-column form 1408, and five-column form 1410. Other styles may also be defined.

The style sheets 112 may be stored locally, or may be stored in a remote location. If the style sheets 112 are stored in a remote location, they may be stored in an addressable location. A virtual directory may be created at a local system such as the system 102 to point to a centrally managed styles distribution director. The different layers of the style sheets 112 may be stored in a single location, or may be stored in different locations.

In an embodiment, a web page may be associated with a web.config file. The web.config file may store configuration information of a web page. The web.config file may configure a path to the master 202 layer style sheet for the web page. All references to the style sheets may be dynamically rendered. Application master 206 and application theme 208 layer style sheets, and images specific to the 206 and 208 layer style sheets, may be stored in a predetermined location, and may be different from the location of the master 202 and master theme 204 layer style sheets.

Referring back to FIG. 3, a page layout may also define a header section 312, content area top section 314, site nav section 316, main content area section 318, content area bottom section 320, and footer section 322. The main content area section 318 may further include the columns 302-310 discussed above. The main content area section 318 may also include a group box 324. Group box 324 may be a visual box in which contents are organized and displayed. Each sections discussed above may be implemented by HTML codes of a web page, or may be defined in style sheets.

Different styles may be defined in style sheets 112 for defining the arrangements of columns 302-310 in the main content area section 318. Styles may be limited for use in specific columns.

FIG. 15 shows a list 1500 of different style sheets which may define the layouts of the columns in the main content area section 318. These style sheets may be the page level layout 212 layer style sheets.

Figure 16:
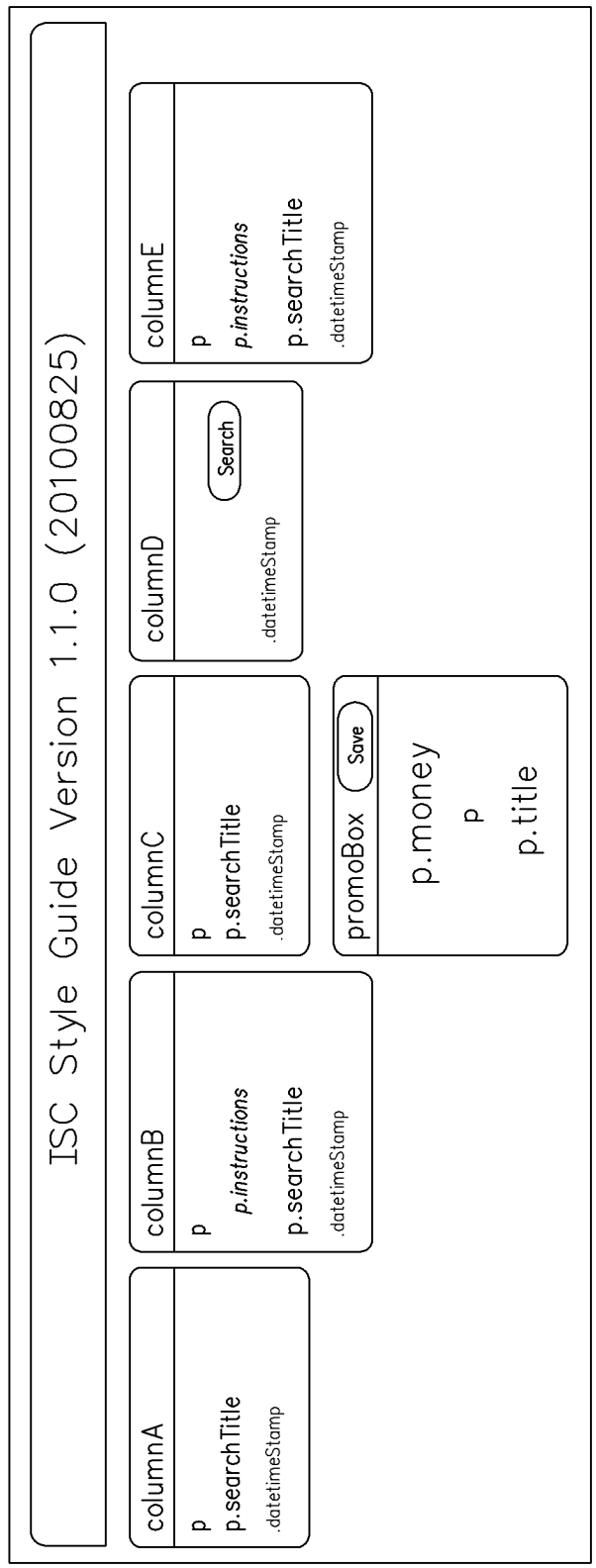
FIG. 16 shows a screenshot of a group box.

FIG. 16 shows a screenshot 1600 of a group box 324. Table 2 shows the underlying HTML code for the group box 324 shown in screenshot 1600.

TABLE 2

```
<div class="groupBox">
    <div class="boxTitle">
        <div class='cornerTopLeft'></div><div
        class='cornerTopRight'></div>
        <p>Title goes here</p>
    </div>
    --content goes here--
    <div class='groupBoxFooter'>
        <div class='groupBoxFooterLeftImg'></div>
        <div class='groupBoxFooterRightImg'></div>
    </div>
</div>
```

A group box may 324 include a box title, contents and a group box footer. Styles for group boxes 324 may be defined in style sheets 112.

An application may have a single application master 206 layer style sheet. The application master 206 layer style sheet may include styles that may apply across multiple pages. The application master 206 layer style sheet may be stored in a local folder named "styles" that may be a child of a root folder for the application, for example "/myapp/styles" for an application called "myapps". In the above example, images for the application master 206 style sheets may be stored in a "/myapp/styles/images" folder. Each image may have an associated style, and the pages of the application may preferably use the styles, rather than referencing images directly, when using an image.

The multilayer method may use page styles, which may apply to a single page. Page styles may be defined in the page level layout 212 layer style sheets. Page styles may be identified in the "pageStyles asp:Content" section of the HTML code for the page. Table 3 shows an example of HTML code showing a use of page styles.

TABLE 3

```
<asp:Content ID="Content2" ContentPlaceHolderID="pageStyles"
runat="Server">
    <style type="text/css" media="screen,print">
        @import
"<%=ConfigurationManager.AppSettings.Get("stylesDir")%>layouts/
sections/layout_sections-20-80.css";
    </style>
        <style media="screen,print" type="text/css">
            .msgPanel {
                position: absolute;
                z-index: 2000;
            }
        </style>
</asp:Content>
```

The multilayer method may also use inline styles. Inline styles may be part of a page style, or part of an application master style. Table 4 shows an example of HTML code using an inline style.

TABLE 4

```
<td style="padding-left: 10px; font-size: 14px;">2 package(s)</td>
```

The multilayer approach may also include an application theme style. An application theme style may be defined in an application theme 208 layer style sheet. An application may include items that change according to different themes. Application theme styles may define such changes. Style sheet files defining the application theme styles may be named in the following convention:

<app name>.<theme name>.css

For example, for an application called "Claims" and a theme named "BlueBerry", the style sheet file name may be "Claims.BlueBerry.css".

The style sheet files defining the application themes may be stored in a folder named after the theme name, for example, in "/App_Themes/<theme name>" folder. Images for the themes may be stored in "/App_Themes/<theme name>/images" folder. Standard theme styles may contain overrides for colors and images. All other settings for the styles may come from an application master 206 layer style sheets or other layers higher up in the hierarchy.

Features such as accordions, sections and title columns may be used in a page to organize page contents. These features may be used with forms to group similar controls. Accordions and sections may be collapsible areas of the page. Accordions may allow only a single area open at a time, and sections may allow multiple sections to be open at the same time. Styles may be defined to support up to two levels, primary and secondary, of nested accordions and/or sections. Title columns may be used to group similar controls within the same section or accordion. Title columns may not be collapsible. The above described features of this paragraph may also be used inside a group box 324.

Figure 17:
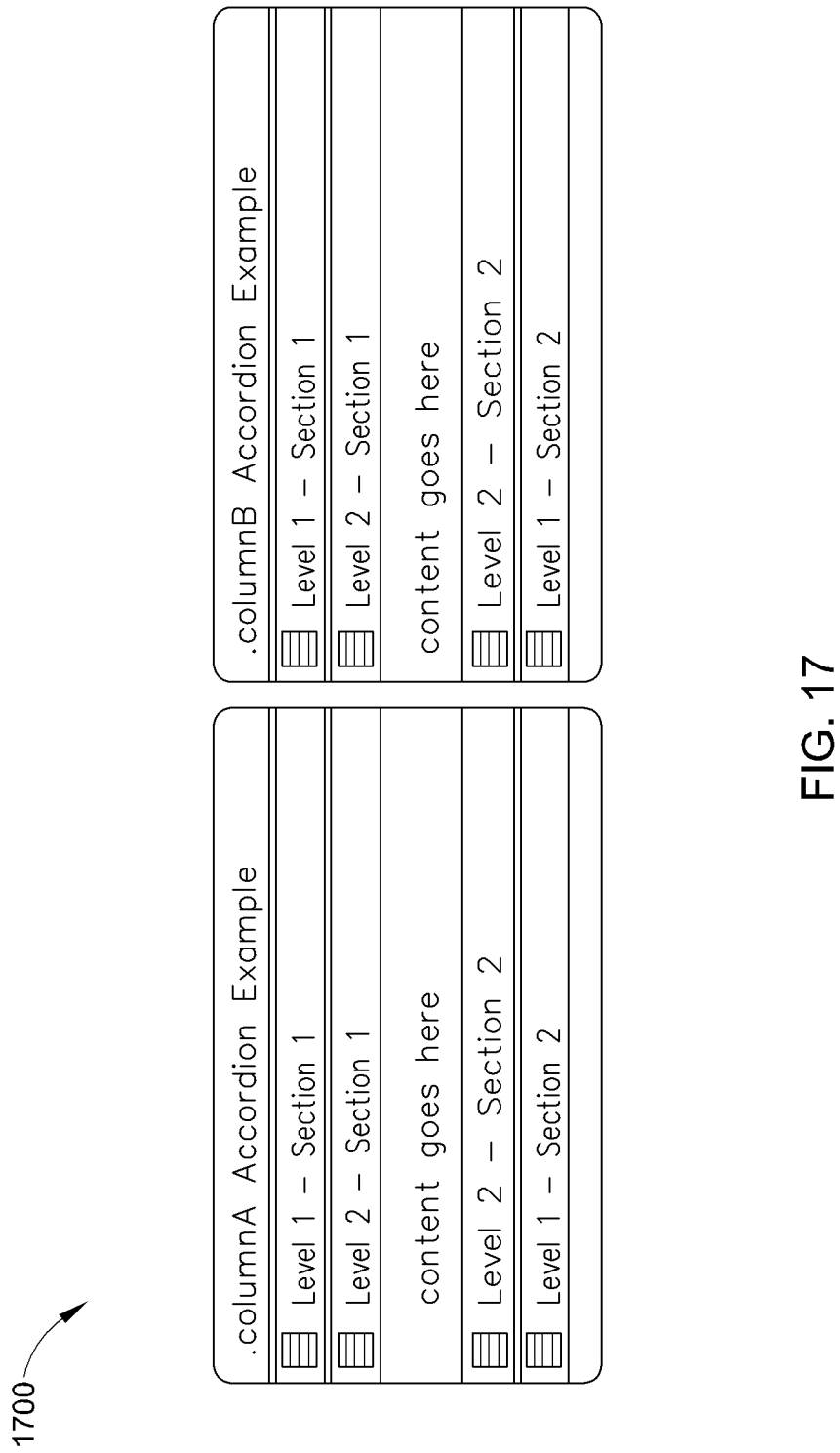
FIG. 17 shows a diagram of accordions.

FIG. 17 shows a diagram 1700 of examples of accordions. Table 5 shows an example of the underlying HTML codes of the accordions shown in diagram 1700.

TABLE 5

```
<div class="accordionTitle" onclick="openColA1 =
accordian(openColA1, 'colA1'); return false;">
<div class="toggleImageOpen" title="Hide Section"
id="colA1Img"></div>
    <span>Level 1 -Section 1</span>
</div>
<div id="colA1" class="colWrapper" style="display:block;">
    <div class="accordionTitle2" onclick="openColA1_1 =
accordian(openColA1_1, 'colA1_1'); return false;">
        <div class="toggleImageOpen" title="Hide Section"
id="colA1_1Img"></div>
        <span>Level 2 - Section 1</span>
    </div>
    <div id="colA1_1" class="colWrapper" style="display:block;">
        <div class="listContainer"><ul><li>content goes
here</li></ul></div>
    </div>
</div>
```

Figure 18:
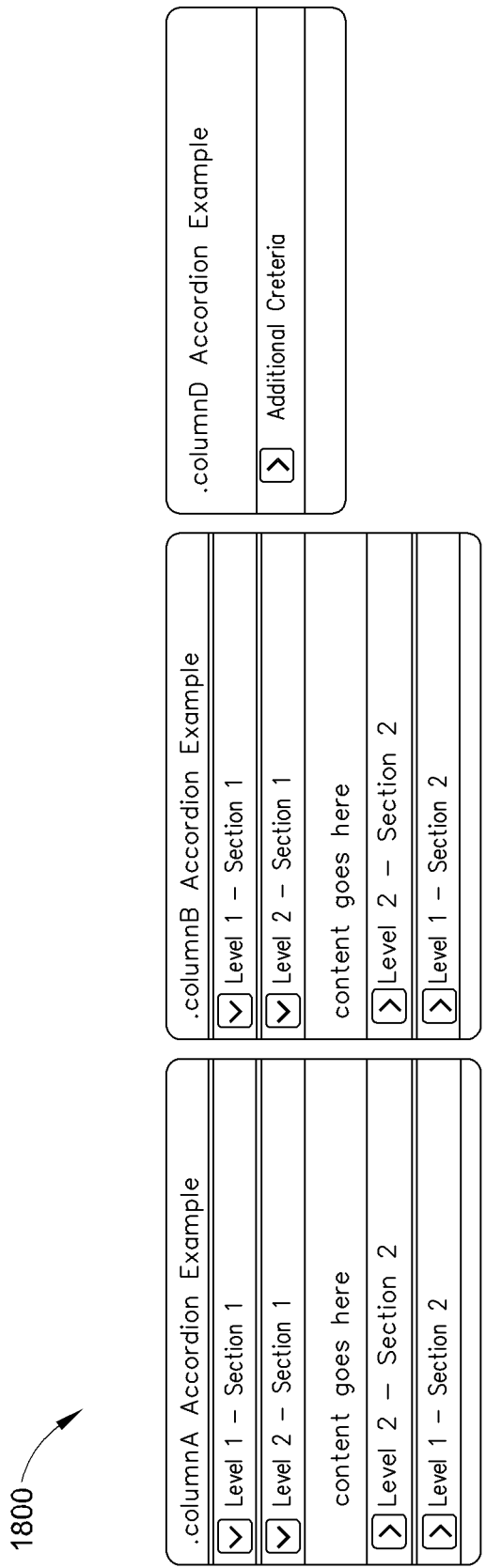
FIG. 18 shows a diagram of examples of sections.

FIG. 18 shows a diagram 1800 of examples of sections. Table 6 shows an example of underlying HTML code for the sections of diagram 1800.

TABLE 6

```
<div class="sectionTitle">
    <div class="toggleImageOpen" title="Hide Section" id="dgA1Img"
onclick="toggleSection('dgA1');"></div>
    <span>Level 1 - Section 1</span>
</div>
<div class="colWrapper" id="dgA1" style="display: block;">
    <div class="sectionTitle2">
        <div class="toggleImageOpen" title="Hide Section"
id="dgA1_1Img" onclick="toggleSection('dgA1_1');"></div>
        <span>Level 2 - Section 1</span>
    </div>
    <div class="colWrapper" id="dgA1_1" style="display: block;">
        <div class="listContainer"><ul><li>content goes
here</li></ul></div>
    </div>
</div>
```

As discussed above, title column styles may be used to group like controls in a form. Title column styles may be defined to display bold texts with a grey background. FIG. 19 shows a diagram 1900 of a title column, and table 7 shows an example of underlying HTML code for the title column.

TABLE 7

```
<div class="titleColumn">
    <p>Your title goes here</p>
</div>
```

Figure 20:
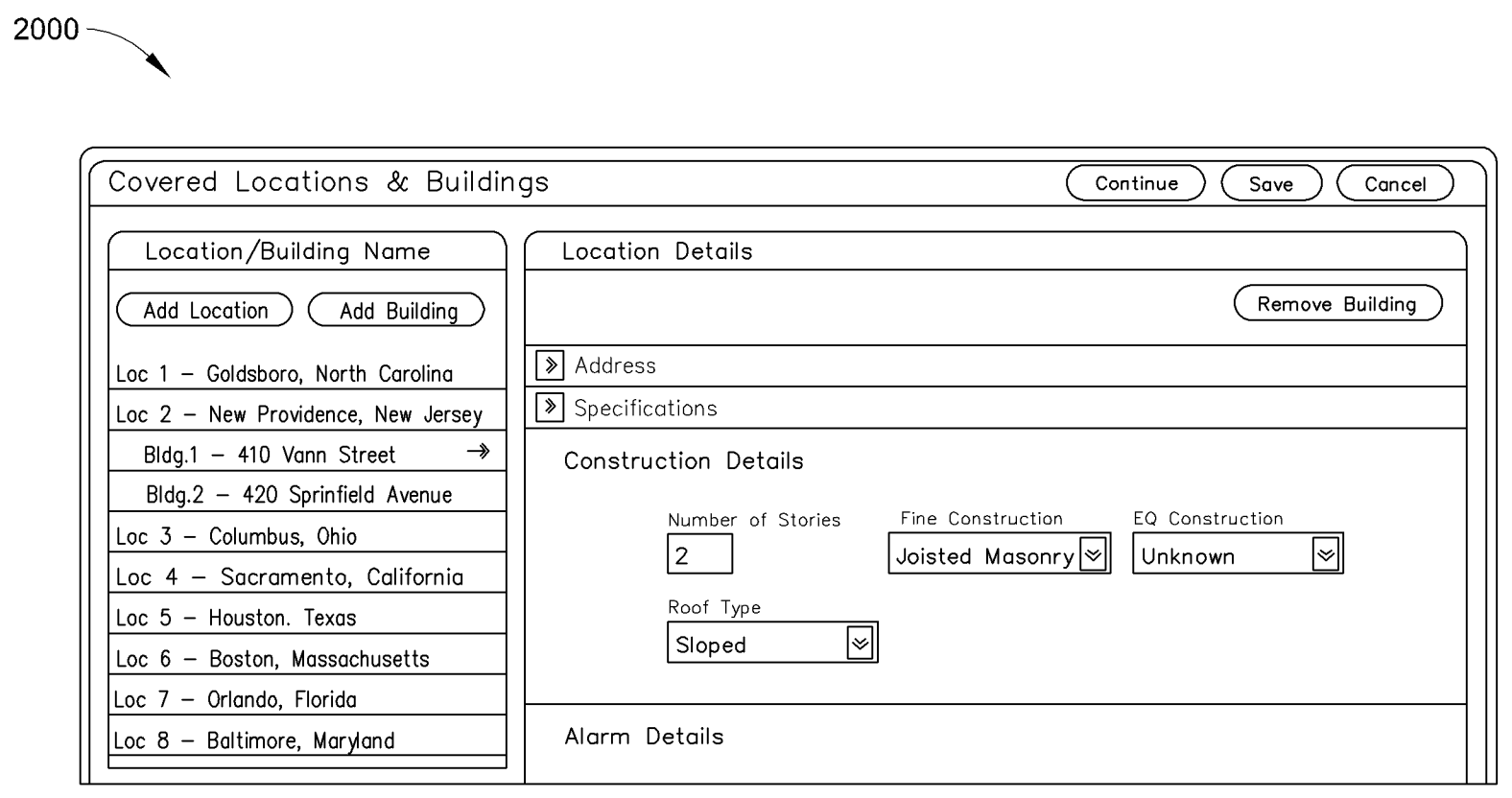

The multilayer method may further use a lateral list metaphor. Lateral list metaphor may be a small twist on the group box 324 and sections discussed above. The lateral list metaphor may support a single level of sections, and a primary color pattern. groupBoxColumnWrapper may be used to create a look of nested group box 324. FIG. 20 shows a diagram 2000 of an example of lateral list metaphor.

Figure 21:
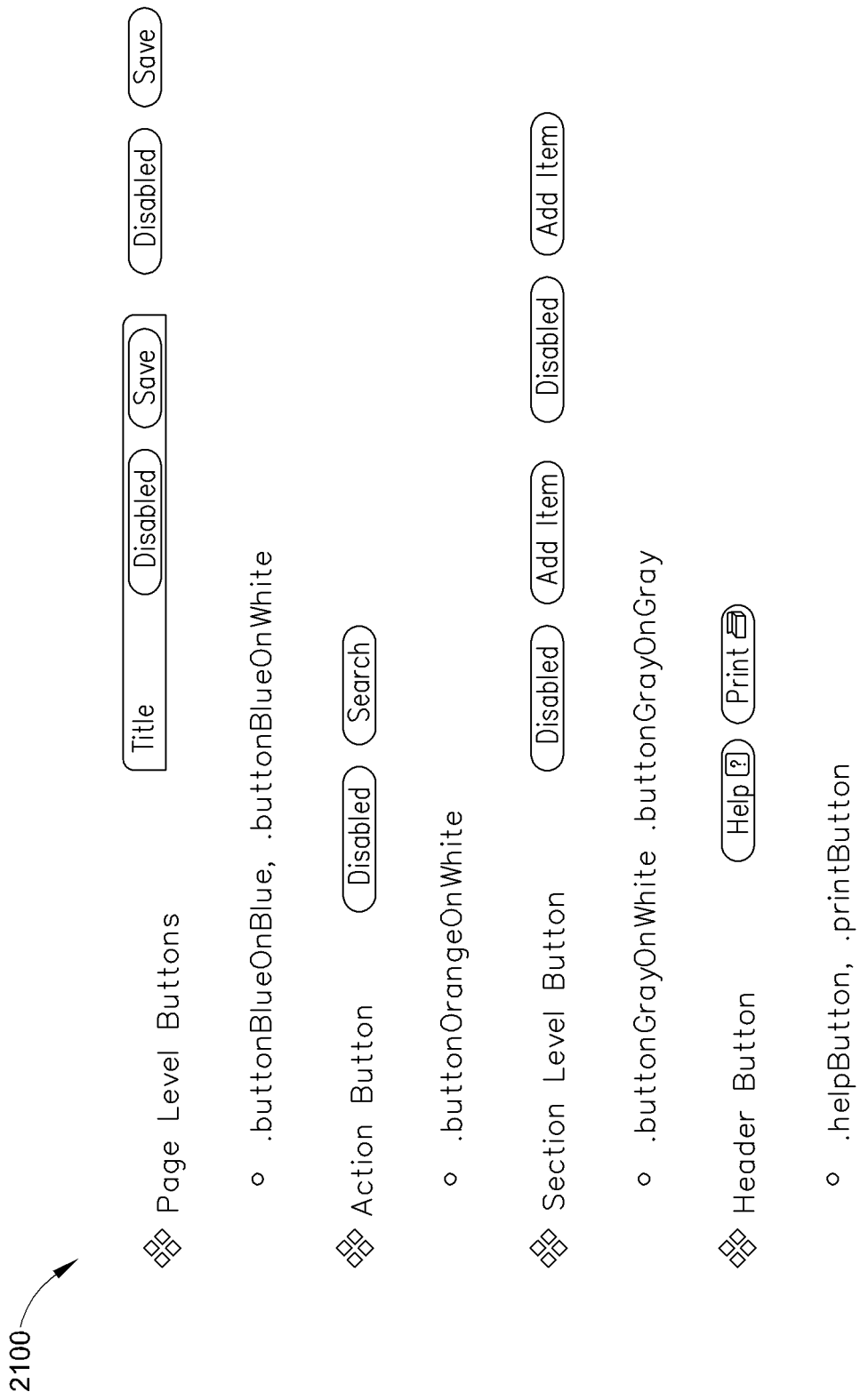
FIG. 21 shows a diagram of styles for buttons.

The multilayer method may further use buttons, and various styles for buttons may be defined, as shown in diagram 2100 of FIG. 21. Styles for the buttons may include, for example, page level buttons such as buttonBlueOnBlue and buttonBlueOnWhite, action buttons such as buttonOrangeOnWhite, section level buttons such as buttonGrayOnWhite and buttonGreyOnGray, and header buttons such as helpButton and printButton. Table 8 shows an example of underlvina HTML code for a button with a buttonBlueOnWhite style.

TABLE 8

```
<div class="buttonBlueOnWhite">
    <a href="#">Save</a>
    <div class='rightImg'></div>
</div>
```

Buttons may be grouped together inside a <div> with one of the following placement styles:

.buttonClear—Used with the print and help buttons;

.buttonClear_topRight—used with the primary buttons in the group box title;

.buttonClear_bottomLeft—used for section level buttons. When this DIV is used, the bottom right DIV should use "buttonClear_bottomRight w50" style pair;

.buttonClear_bottomRight—used with any type of button placed on the bottom right side of a group box.

Forms may be used to layout controls on a page. As discussed above, styles may allow a developer to specify the number of columns for each form.

FIG. 22 shows a diagram 2200 of an example of a form. The following is a list of examples of form styles:

.formLayout—all forms may be contained inside a DIV

.twoColumn—.fiveColumn—used to modify the formLayout styles to support different column layouts (class="form Layout threeColumn")

.small—1 column in the layout;

.medium—2 columns in the layout;

.large—3 columns in the layout;

.fullrow—spans a complete row;

.pairedControl—may be used with medium and large <div> tags to allow multiple controls to be placed inside the same control <div> tag;

.resizable—may be used with standard HTML controls so the control is the full width of the <div> application controls may have SKINs to control width.

.required—may be used to provide formatting for the required field indicator.

Paragraph styles may also be used, for example p, p.viewonly, and p.helpText.

The above styles are exemplary only, and other styles may also be defined and used.

The multilayer method may further use HTML unordered lists for menu, wizards, and lists of links. The HTML unordered lists may be manipulated with style sheets 112. "listContainer" styles may be used for the lists:

.complete—indicates task is complete

.selected—indicates the item is selected

.label—list item is a label

Figure 23:
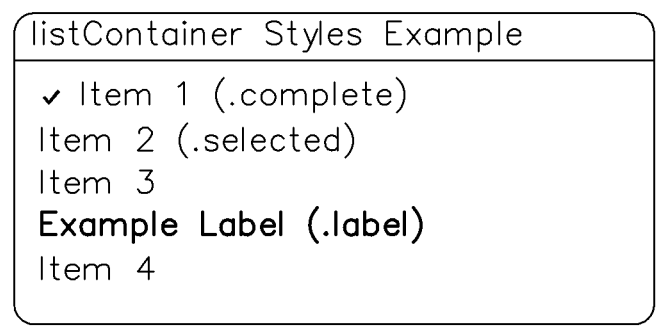
FIG. 23 shows a diagram of a list.

FIG. 23 shows a diagram 2300 of an example of list using the listContainer style, and table 9 shows an example of the underlying HTML code for the list.

TABLE 9

```
<div class="listContainer">
    <ul>
        <li class="complete">
            <div class="icon_item_completed"></div>
            <a href="#">Item 1 (.complete)</a>
        </li>
        <li class="selected"><a href="#">Item 2 (.selected)</a> </li>
        <li><a href="#"><a href="#">Item 3</a></li>
        <li class="label"><a href="#">Example Label (.label)</a></li>
        <li><a href="#"><a href="#">Item 4</a></li>
    </ul>
</div>
```

Figure 24:
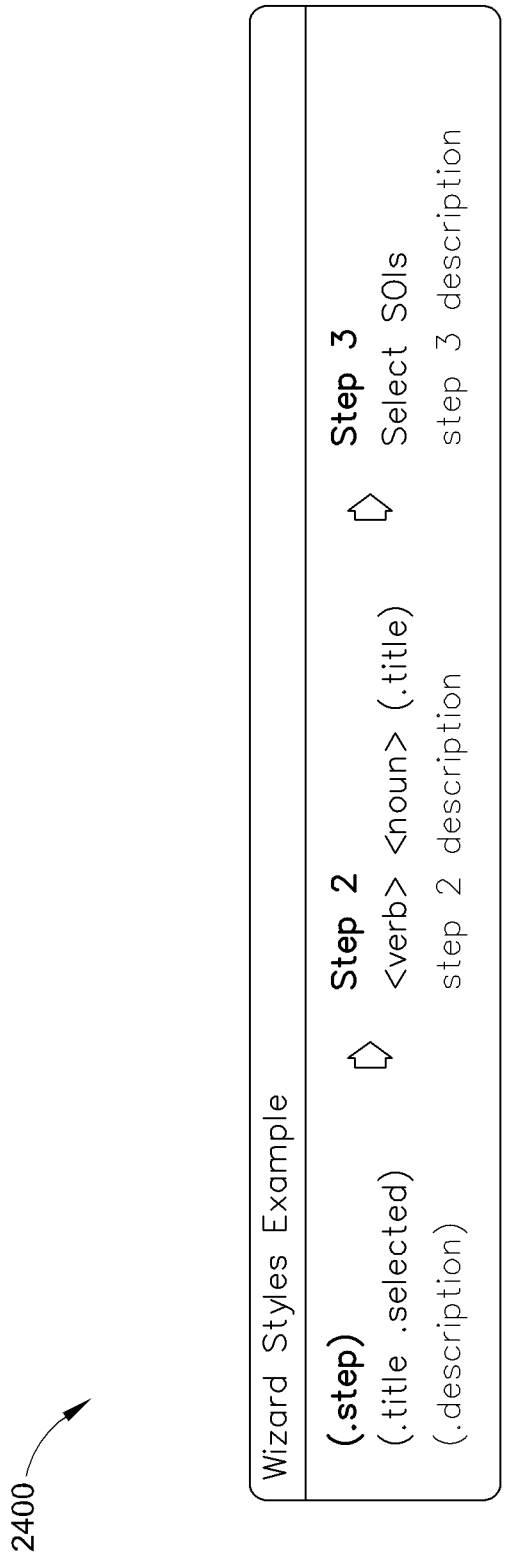
FIG. 24 shows a diagram of a wizard.

FIG. 24 shows a diagram 2400 of an example of a wizard. Table 10 shows an example of underlying HTML for a wizard. Styles may be defined for the wizard layouts. Styles may be provided for two to six steps in a wizard. The styles may include the styles "step" and "title". Styles for the descriptions of the wizard may also be included.

TABLE 10

```
<div class="wizard">
    <ul class="wizardNav">
        <li>
            <ul>
                <li class="step">(.step)</li>
                <li class="title selected">
                    <a href="#">(.title .selected)</a>
                </li>
                <li class="description">(.description)</li>
            </ul>
        </li>
        <li class="arrow"></li>
        <li>
            <ul>
                <li class="step">Step 2</li>
                <li class="title">
                    <a href="#"><verb> <noun> (.title)</a>
                </li>
                <li class="description">step 2 description</li>
            </ul>
        </li>
    </ul>
</div>
```

Style sheet files for styles of wizards with different number of steps may be provided, such as for a two-step wizard to a six-step wizard.

Figure 25:
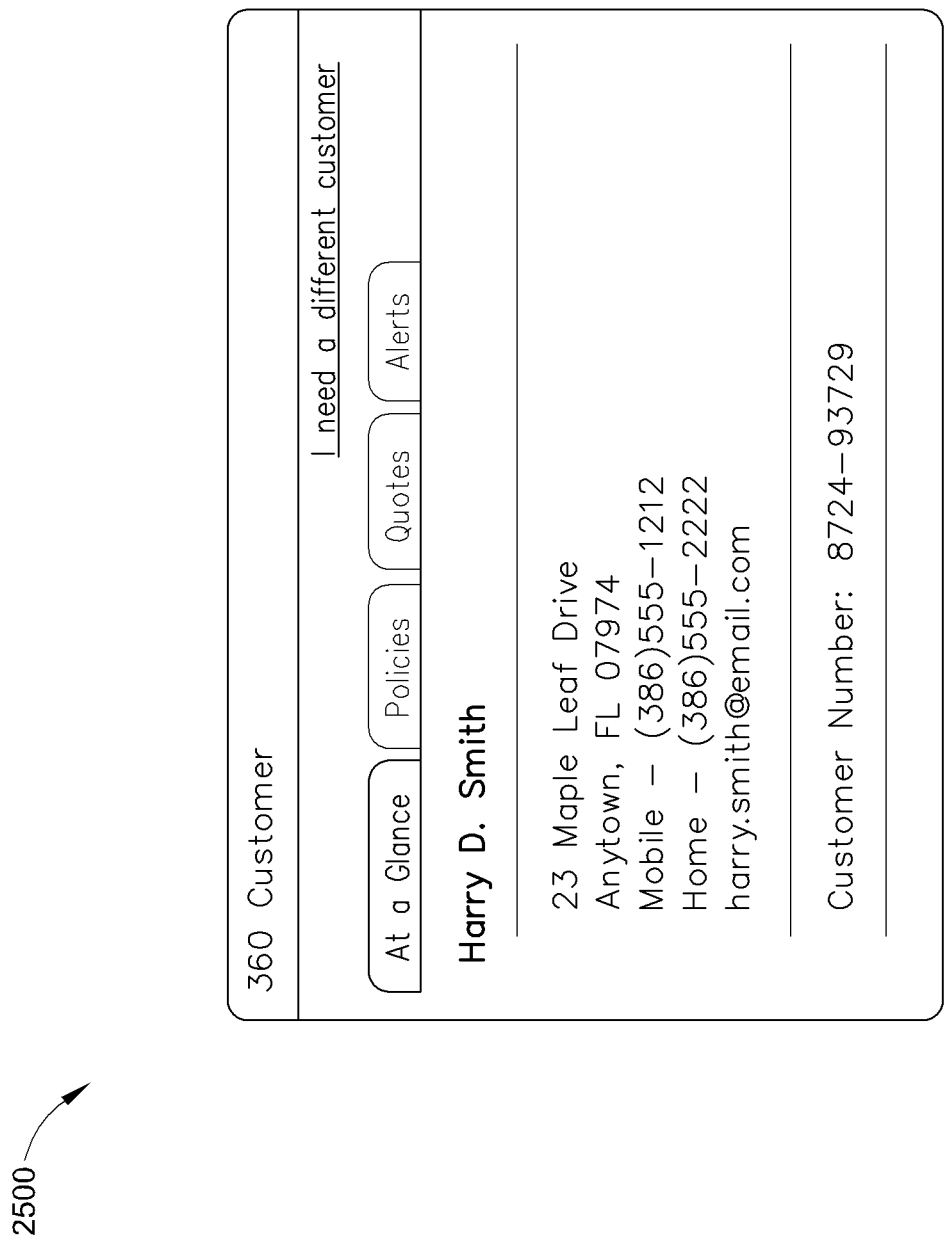
FIG. 25 shows a diagram of an address detail list.

"addressDetails" style may also be provided for a list of address details. FIG. 25 shows a diagram 25 of an address detail, and table 11 shows an example of underlying HTML code for the address detail list.

TABLE 11

```
<ul class="addressDetails">
    <li>
        Harry D. Smith
        <ul>
            <li>23 Maple Leaf Drive</li>
            <li>Anytown, FL 07974</li>
            <li>Mobile - (386)555 - 1212</li>
            <li>Home - (386)555 - 2222</li>
            <li>harry.smith@email.com</li>
        </ul>
        <ul>
            <li class="bottomBorder">
                Customer Number: 8724-93729
            </li>
        </ul>
    </li>
</ul>
```

Styles for HTML tables may also be provided. Tables may be used to display information that may be organized in a multicolumn, multiple row layout. This layout is different from a page layout. Table 12 shows an example of underlying HTML code for an HTML table.

TABLE 12

```
<table class="listTable" cellpadding="0" cellspacing="0" border="0">
    <tr>
        <th width="15%"><div>ID</div></th>
        <th width="85%"><div>Description</div></th>
    </tr>
    <tr>
        <td>12305</td>
        <td>text goes here</td>
    </tr>
</table>
```

Styles for HTML tables may include, for example, "listTable", which may be the primary style for content tables.

Styles may be provided for table headers (TH), and rows (TR) may have roll-over and selected row treatments. Table sub headers, and collapsible row treatment may be provided.

Tables for search preview and similar tables may use a standard table. FIG. 26 shows a diagram 2600 of a table for search preview. Table 13 shows an example of underlying HTML code for the search preview table.

TABLE 13

```
<table width="95%" align="center" border="0" cellpadding="0"
cellspacing="4px" summary="">
    <tr>
        <td colspan="2"><br><strong>Field Information</strong></td>
    </tr>
    <tr>
        <td width="30%" class="normal">Data Type</td>
        <td width="70%" class="shadedRow">Valid Value</td>
    </tr>
    <tr>
        <td class="normal">Description</td>
        <td class="shadedRow">This field indicates that towing is covered
under the policy.</td>
    </tr>
</table>
```

FIG. 27 shows a diagram 27 of an action table. An action table may be used on claim trees and other locations where menus are needed. actionTable and shaded Row treatment may change on roll-over.

Styles for a dashboard table may also be provided. FIG. 28 shows a diagram 2800 of a dashboard table. Table 14 shows an example of the underlying HTML code for a dashboard table.

TABLE 14

```
<table class="dashboardTable" align="center" border="0"
cellpadding="0" cellspacing="0"
summary="" width="97%">
    <tr class="oddRow">
        <td align="center"><a href="#"><div
class="icon_rules1"></div></a></td>
        <td>
            <p class="title"><a href="#">System Downtime</a></p>
            System downtime this Saturday, March 17
        </td>
    </tr>
    <tr class="evenRow">
        <td align="center"><a href="#"><div
class="icon_rules2"></div></div></a></td>
        <td>
            <p class="title"><a href="#">New Regulatory
Requirements </a></p>
            As of June 1, replace all existing EOB forms due to new
regulatory requirements
        </td>
    </tr>
</table>
```

A plainTable style may also be provided for simple label/value layout. FIG. 29 shows a diagram 2900 of a plain table. Table 15 shows an example of an underlying HTML code for the plain table.

TABLE 15

```
<table class="plainTable" cellpadding="3px" cellspacing="0" border="0"
width="100%" summary="" >
    <tr>
        <td width="40%" class="fieldLabel">Policy Number</td>
        <td width="60%">C91_172_A102</td>
    </tr>
    <tr>
        <td class="fieldLabel">Policy Status</td>
        <td>INFORCE</td>
    </tr>
</table>
```

Table 16 shows code for RadGrid.

TABLE 16

```
<asp:XmlDataSource ID="XmlDataSource1" runat="server"
DataFile="xml/basicGridData.xml" />
<telerik:RadGrid ID="basicGrid" DataSourceID="basicGridData"
runat="server">
    <MasterTableView DataKeyNames="id" runat="server"
    GridLines="None">
        <Columns>
            <telerik:GridBoundColumn UniqueName="id"
DataField="id"
HeaderText="ID" HeaderButtonType="None"
                ItemStyle-Width="15%" HeaderStyle-Width="15%">
            </telerik:GridBoundColumn>
            <telerik:GridBoundColumn UniqueName="name"
DataField="name" HeaderText="Name"
                HeaderButtonType="None" ItemStyle-Width="35%"
HeaderStyle-Width="35%">
            </telerik:GridBoundColumn>
            <telerik:GridBoundColumn UniqueName="required"
DataField="required" HeaderText="Required"
                ItemStyle-Width="12%" HeaderStyle-Width="12%"
HeaderButtonType="None">
            </telerik:GridBoundColumn>
            <telerik:GridTemplateColumn HeaderText="Product"
HeaderButtonType="None" UniqueName="product">
                <ItemTemplate>
                    <div class="threeline">
                        <asp:Label ID="product"
Text='<%#Bind("product") %>' runat="server"></asp:Label>
                    </div>
                    <telerik:RadToolTip ID="RadToolTip1"
runat="server" TargetControlID="product">
                        <%#DataBinder.Eval(Container,
"DataItem.product") %>
                    </telerik:RadToolTip>
                </ItemTemplate>
            </telerik:GridTemplateColumn>
        </Columns>
    </MasterTableView>
</telerik:RadGrid>
```

Figure 30:
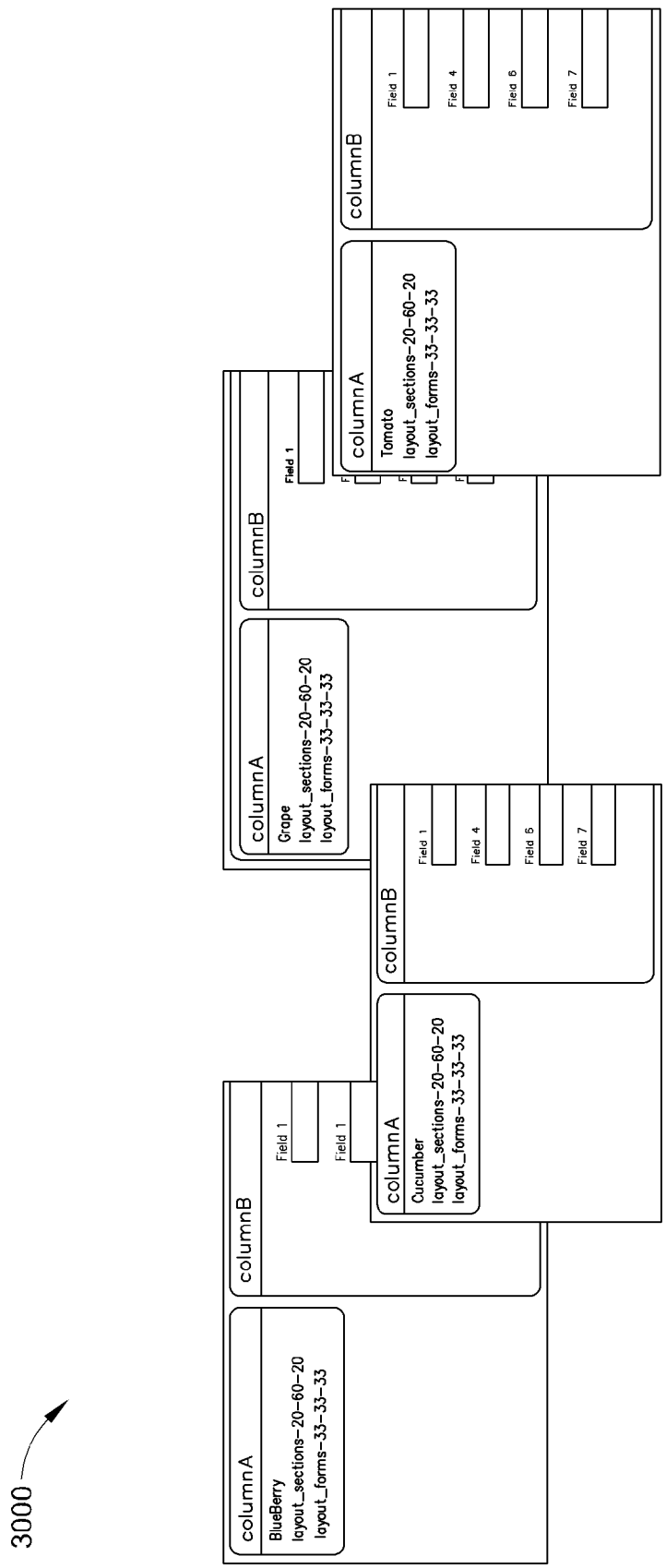
FIG. 30 shows a diagram of various themes of the multilayer method.

The multilayer method may provide various themes. These themes may be defined in the master theme 204, and application theme 208 layer style sheets. In an embodiment, four themes may be provided, such as, for example, BlueBerry, Cucumber, Grape, and Tomato. A default theme may be set in the web.config file. Themes may be changed dynamically by changing the page.theme setting. Custom themes may be placed under the App_Themes folder. FIG. 30 shows a diagram 3000 of various themes. Themes may change a few colors, or the change may be extensive.

FIG. 31 shows a list 3100 of examples of section layout style sheets. FIG. 32 shows a list 3200 of examples of form layout style sheets.

Table 17 shows a file structure of style sheets which may be used for an embodiment.

TABLE 17

| | | |
|---|---|---|
| MyProject | | |
|   styles | | |
|     application.master.css | | REQUIRED |
| | | Contains any application specific master styles |
|     images | | |
|       app_logo.gif | | REQUIRED |
|   App_Themes | | |
|     BlueBerry | | |
|       telerik.skin | | REQUIRED |
|       zzzMyProject.BlueBerry.css | | OPTIONAL -- only needed if there are application |
|       images | | specific styles that need to change with the theme |
|         theme images | | |
|     BlueBerryHighContrast | | |
|       telerik.skin | | REQUIRED |
|       zzzMyProject.BlueBerry.css | | OPTIONAL -- only needed if there are application |
|       images | | specific styles that need to change with the theme |
|         theme images | | |

TABLE 17-continued

| | |
|---|---|
| Grape | |
|     telerik.skin | REQUIRED |
|     zzzMyProject.Grape.css | OPTIONAL -- only needed if there are application |
|     images | specific styles that need to change with the theme |
|         theme images | |
| Tomato | |
|     telerik.skin | REQUIRED |
|     zzzMyProject.Tomato.css | OPTIONAL -- only needed if there are application |
|     images | specific styles that need to change with the theme |
|         theme images | |
| MyCustomTheme | OPTIONAL -- only needed for a custom theme |
|     telerik.skin | REQUIRED |
|     zzzASW.MyCustomTheme.css | ASW theme specific stylesheet |
|     zzzMyProject.MyCustomTheme.css | Project specific theme styles |
|     images | |
|         3 image files | ASW theme specific images |
|         app theme images | Application specific themed images |
|     Telerik.MyCustomTheme.css | |
|     16 images folders for Telerik | |

Figure 33:
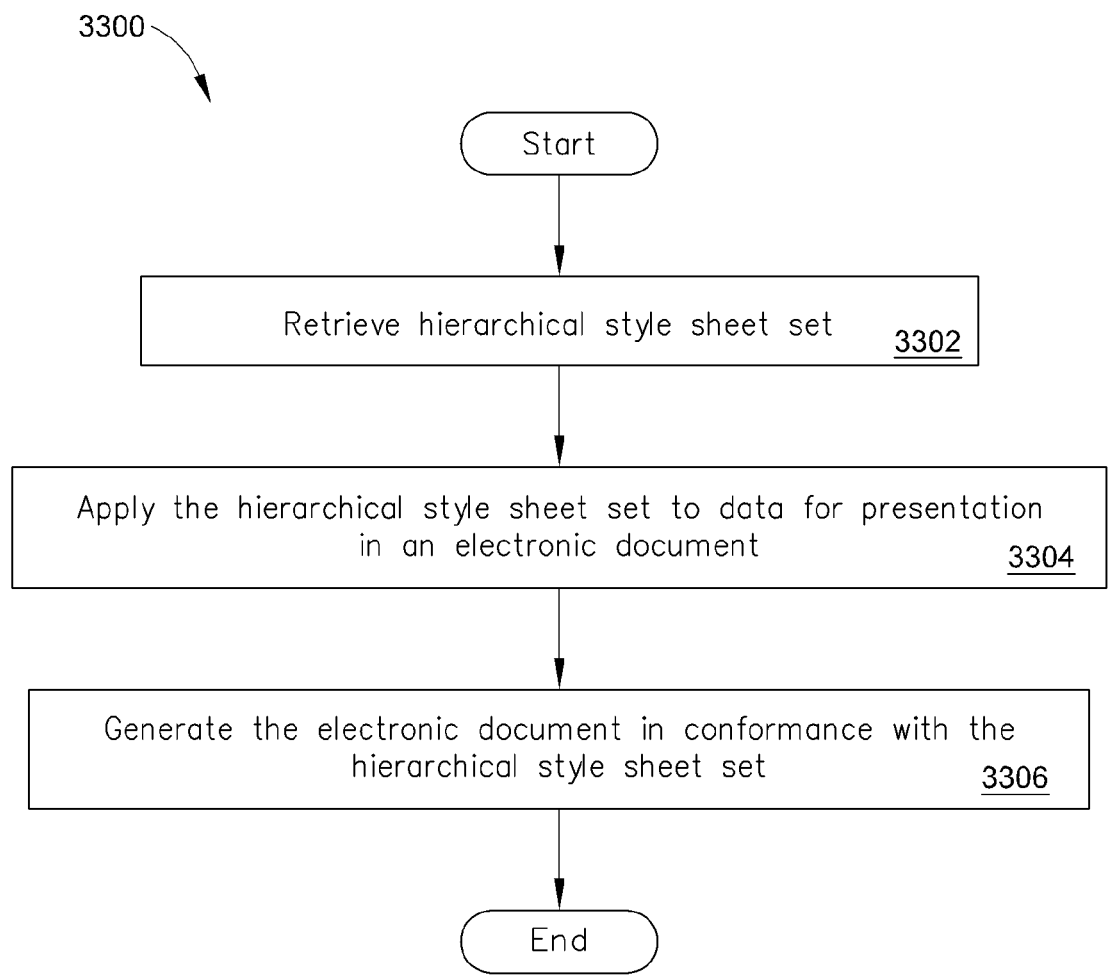
FIG. 33 shows a flow diagram of document formatting logic for the multilayer style sheet approach that the system may implement.

FIG. 33 shows a flow diagram 3300 for the document formatting logic 122.

First, a hierarchical style sheet set may be retrieved (3302). Next, the style sheets set may be applied to electronic document data for presentation in an electronic document (3304). Then, the electronic document may be generated according to the hierarchical style sheet set (3306).

As discussed above, the electronic document data may be a web page file, and the electronic document may be a web page. The web page file may contain HTML codes which defines a web page. The web page file may reference a plurality of style sheets which may define the arrangement of features and the look and feel of the web page. The plurality of style sheets may include layers of style sheets which conform to a hierarchy. A higher layer style sheet may define features which apply across all web pages of application or website, while lower layer style sheet may define features which apply to a smaller scope of web pages or apply to features within a web page. Each layer of style sheets may include all the features defined in the higher layer style sheet. Further, a lower layer style sheet may redefine a feature defined in a higher layer style sheet. For example, if a higher layer style sheet defines a box to be blue, and a lower layer style sheet defines a box to be green, the web page may contain a green box. Each layer of the style sheet may be managed in the same manner. Each layers may also be managed in a different manner. For example, in an embodiment, style sheets of the first two highest layers may be managed centrally by a single entity, and stored at a central location. Next four layers may be stored locally at a server running an application or web site. In another embodiment, all style sheets may be managed by a single entity and centrally stored in a single location.

The systems, methods and logic described above may be implemented in many different ways. The techniques may be implemented in a single system or implemented across multiple systems. As another example, the systems, method and logic may be implemented as computer-executable instructions or as data structures in memory may be stored on, distributed across, or read from many different types of machine-readable media. The machine-readable media may include RAM, ROM, hard disks, floppy disks, CD-ROMs, a signal, such as a signal received from a network or partitioned into sections and received in multiple packets communicated across a network. The systems may be implemented in software, hardware, or a combination of software and hardware.

Furthermore, the systems may be implemented with additional, different, or fewer components. As one example, a processor or any other logic, module, or component may be implemented with a microprocessor, a microcontroller, a DSP, an application specific integrated circuit (ASIC), program instructions, discrete analog or digital logic, or a combination of other types of circuits or logic. As another example, memories may be DRAM, SRAM, Flash or any other type of memory. The systems may be distributed among multiple components, such as among multiple processors and memories, optionally including multiple distributed processing systems. Logic, such as programs or circuitry, may be combined or split among multiple programs, distributed across several memories and processors, and may be implemented in or as a function library, such as a dynamic link library (DLL) or other shared library.

While various embodiments of the invention have been described, it will be apparent to those of ordinary skill in the art that many more embodiments and implementations are possible within the scope of the invention. Further embodiments, implementation details and background are described in the Appendix A and Appendix B. Accordingly, the invention is not to be restricted except in light of the attached claims and their equivalents.

We claim:

1. A method for formatting a document using a multilayer style sheet approach, the method comprising:

retrieving, with a processor, a hierarchical style sheet set comprising a plurality of style sheet layers organized in a hierarchy, the plurality of layers comprising characteristics of features of an electronic document;

applying, with document formatting logic executed by the processor, the hierarchical style sheet set to data for presentation in an electronic document;

generating the electronic document in conformance with the hierarchical style sheet set; and overriding a characteristic of a feature in a layer higher in the hierarchical style sheet set if a layer lower in the hierarchical style sheet set includes a characteristic of the same feature.

2. The method of claim 1, wherein each style sheet layer in the hierarchical style sheet set includes all of the characteristics of features in layers higher in the hierarchical style sheet set.

3. The method of claim 1, wherein the hierarchical style sheet set conforms to a predefined electronic document coding pattern.

4. The method of claim 1, wherein the hierarchical style sheet set comprises six layers.

5. The method of claim 4, where the six layers comprise a master layer.

6. The method of claim 4, where the six layers comprise a master theme layer.

7. The method of claim 4, where the six layers comprise an application master layer.

8. The method of claim 4, where the six layers comprise a application theme layer.

9. The method of claim 4, where the six layers comprise a client theme layer.

10. The method of claim 4, where the six layers comprise a page level layout layer.

11. The method of claim 4, wherein the electronic document comprises a web page.

12. A system for formatting a document using a multilayer style sheet approach, the system comprising:
 a processor;
 a memory coupled to the processor;
 a hierarchical style sheet set stored in the memory, the hierarchical style sheet set comprising a plurality of style sheet layers organized in a hierarchy, the plurality of layers comprising characteristics of features of an electronic document; and
 document formatting logic stored in the memory, the document formatting logic when executed causes the processor to:
 retrieve the hierarchical style sheet set;
 apply the hierarchical style sheet set to data for presentation in an electronic document;
 generate the electronic document in conformance with the hierarchical style sheet set; and
 override a characteristic of a feature in a layer higher in the hierarchical style sheet set if a layer lower in the hierarchical style sheet set includes a characteristic of the same feature.

13. The system of claim 12, wherein each style sheet layer in the hierarchical style sheet set includes all of the characteristics of features in layers higher in the hierarchical style sheet set.

14. The system of claim 12, wherein the hierarchical style sheet set conforms to a predefined electronic document coding pattern.

15. The system of claim 12, wherein the hierarchical style sheet set comprises six layers.

16. The system of claim 15, where the six layers comprise a master layer.

17. The system of claim 15, where the six layers comprise a master theme layer.

18. The system of claim 15, where the six layers comprise an application master layer.

19. The system of claim 15, where the six layers comprise an application theme layer.

20. The system of claim 15, where the six layers comprise a client theme layer.

21. The system of claim 15, where the six layers comprise a page level layout layer.

22. The system of claim 15, wherein the electronic document comprises a web page.

* * * * *

UNITED STATES PATENT AND TRADEMARK OFFICE
CERTIFICATE OF CORRECTION

| | | |
|---|---|---|
| PATENT NO. | : 8,924,847 B2 | Page 1 of 1 |
| APPLICATION NO. | : 13/436182 | |
| DATED | : December 30, 2014 | |
| INVENTOR(S) | : Jonathan E. Peters et al. | |

It is certified that error appears in the above-identified patent and that said Letters Patent is hereby corrected as shown below:

In the Specification

In column 10, line 13, before "HTML code for" replace "underlvina" with --underlying--.

In column 13, line 3, after "actionTable and" replace "shaded Row" with --shadedRow--.

Signed and Sealed this
Twenty-third Day of February, 2016

Michelle K. Lee
*Director of the United States Patent and Trademark Office*